US012615666B2

(12) United States Patent
Le Houerou et al.

(10) Patent No.: US 12,615,666 B2
(45) Date of Patent: Apr. 28, 2026

(54) MANAGING EDCA PARAMETERS WITH LOW LATENCY RELIABLE TRAFFIC

(71) Applicant: CANON KABUSHIKI KAISHA, Tokyo (JP)

(72) Inventors: Brice Le Houerou, Acigne (FR); Stéphane Baron, Le Rheu (FR); Julien Sevin, Saint Aubin du Cormier (FR)

(73) Assignee: Canon Kabushiki Kaisha, Tokyo (JP)

( * ) Notice: Subject to any disclaimer, the term of this patent is extended or adjusted under 35 U.S.C. 154(b) by 325 days.

(21) Appl. No.: 18/258,317

(22) PCT Filed: Dec. 16, 2021

(86) PCT No.: PCT/EP2021/086286
§ 371 (c)(1),
(2) Date: Jun. 19, 2023

(87) PCT Pub. No.: WO2022/136126
PCT Pub. Date: Jun. 30, 2022

(65) Prior Publication Data
US 2024/0040621 A1     Feb. 1, 2024

(30) Foreign Application Priority Data
Dec. 22, 2020     (GB) .................................... 2020431

(51) Int. Cl.
*H04W 74/0816*     (2024.01)
*H04W 48/08*     (2009.01)
(52) U.S. Cl.
CPC ....... *H04W 74/0816* (2013.01); *H04W 48/08* (2013.01)
(58) Field of Classification Search
CPC . H04L 47/6215; H04L 5/0007; H04L 5/0055; H04W 28/0268; H04W 48/08;
(Continued)

(56) References Cited

U.S. PATENT DOCUMENTS 7,277,409 B1     10/2007 Thermond et al.
10,091,682 B2     10/2018 Sun et al.
(Continued)

FOREIGN PATENT DOCUMENTS

JP     2006304115 A     11/2006
WO     2015184379 A2     12/2015
(Continued)

OTHER PUBLICATIONS

Patrice Nezou et al., Low-Latency Triggered TWT, IEEE 802.11-20/1843r2, Dec. 16, 2020.
(Continued)

*Primary Examiner* — Christopher Biagini
(74) *Attorney, Agent, or Firm* — Canon U.S.A., Inc. IP Division

(57)     ABSTRACT

A network adopts Low Latency Reliable Service measures to ensure LLRS traffic has priority over not-LLRS traffic. LLRS capable and not-capable stations coexist and share the same wireless medium. LLRS not-capable stations complete an ongoing legacy contention free transmission TXOP regardless of any needs of station to transmit LLRS. LLRS transmissions thus wait for a long time before starting. An AP detects LLRS activity in the network and modify the EDCA TXOP limit parameter of a BSS to force the stations to reduce their TXOP while LLRS activity remains. The AP can organize a BSS for LLRS capable stations and another BSS for LLRS not-capable stations. Refusal for association to such BSSs or disassociation from such BSSs can include a code indicating to the refused/disassociated stations that a BSS more adapted to its LLRS capability is available.

13 Claims, 9 Drawing Sheets

- - - - → Not-LLRS data traffic
──────→ LLRS data traffic

| STA | LLRS capable non-AP station |
| STA | Legacy non-AP station / LLRS not-capable non-AP station |

(58) Field of Classification Search
CPC ......... H04W 52/0216; H04W 72/0446; H04W 74/002; H04W 74/006; H04W 74/04; H04W 74/0808; H04W 74/0816; H04W 84/12; H04W 88/08
See application file for complete search history.

(56) References Cited

U.S. PATENT DOCUMENTS

| | | | |
|---|---|---|---|
| 10,728,802 | B2 | 7/2020 | Adachi et al. |
| 10,856,178 | B2 * | 12/2020 | Tomeba ................ H04W 76/10 |
| 2006/0114928 | A1 * | 6/2006 | Utsunomiya ..... H04W 74/0875 370/448 |
| 2013/0287043 | A1 | 10/2013 | Nanda et al. |
| 2015/0245236 | A1 * | 8/2015 | Lu ....................... H04W 52/265 370/252 |
| 2017/0070881 | A1 * | 3/2017 | Sun ....................... H04L 63/061 |
| 2017/0181039 | A1 | 6/2017 | Adachi et al. |
| 2021/0111855 | A1 * | 4/2021 | Verma ................ H04W 72/044 |

FOREIGN PATENT DOCUMENTS

| | | | |
|---|---|---|---|
| WO | 2016088727 | A1 | 6/2016 |
| WO | 2018119231 | A1 | 6/2018 |

OTHER PUBLICATIONS

Dave Cavalcanti (Intel Corporation), Low latency service in 802.11be, IEEE 802.11-20/0418r4, IEEE mentor, Aug. 12, 2020.
Guogang Huang (Huawei), Discussion on Multi-link Setup, IEEE 802.11-20/1534r4, IEEE mentor, Dec. 16, 2020.
Hanseul Hong (Yonsei Univ.), Multi-link setup procedure, IEEE 802.11-19/1614r0, IEEE mentor, Sep. 18, 2019.

* cited by examiner

| Value | Information | |
|---|---|---|
| 87 | LLRS capability | Set to 1 to indicate that the non-AP station is LLRS capable. Set to 0 otherwise |

500

| Value | Information | |
|---|---|---|
| 88 | Passive LLRS capability | Set to 1 to indicate that the non-AP station is passive LLRS capable. Set to 0 otherwise |
| 89 | Active LLRS capability | Set to 1 to indicate that the non-AP station is active LLRS capable. Set to 0 otherwise |

600

MANAGING EDCA PARAMETERS WITH LOW LATENCY RELIABLE TRAFFIC

CROSS-REFERENCE TO RELATED APPLICATIONS

This application is the National Phase entry of PCT Application No. PCT/EP2021/086286, filed on Dec. 16, 2021 and titled "MANAGING EDCA PARAMETERS WITH LOW LATENCY RELIABLE TRAFFIC", which claims the benefit under 35 U.S.C. § 119(a)-(d) of United Kingdom Patent Application No. 2020431.9, filed on Dec. 22, 2020 and entitled "MANAGING EDCA PARAMETERS WITH LOW LATENCY RELIABLE TRAFFIC". The above cited patent applications are incorporated herein by reference in their entireties.

FIELD OF THE INVENTION

The invention relates to the technical field of wireless communication networks, and more particularly methods and devices for transmitting Low Latency Reliable Service (LLRS) data traffic in Extremely High Throughput (EHT) systems.

BACKGROUND OF THE INVENTION

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

The 802.11 family of standards adopted by the Institute of Electrical and Electronics Engineers (IEEE®) provides a great number of mechanisms for wireless communications between stations.

With the development of latency sensitive applications such as online gaming, real-time video streaming, virtual reality, drone or robot remote controlling, better low latency and robustness requirements and issues need to be taken into consideration. For instance, 99.9% of latency sensitive packets should be delivered to the end equipment within a 2 ms latency.

Such problematic issues are currently under consideration by the IEEE 802.11 working group as a main objective to issue the next major 802.11 release, known as 802.11 be or EHT for "Extremely High Throughput".

Low latency reliable services, LLRS, have been defined as targets of such main objective. LLRSs are services provided to a higher layer traffic stream that prioritize and deliver MSDUs (data units) within a worst-case latency budget with a given reliability/packet delivery ratio (PDR) and low jitter.

For instance, the 802.11be Project Authorization Request (PAR) targets a worst-case latency of 5 ms for realtime gaming.

Some low latency, LL, measures are being studied in order to prioritize LLRS traffic within a BSS (Basic Service Set) with a view of meeting QoS constraints.

Some LL measures, passive measures, may be applied by non-AP stations that do not participate to the 10LLRS traffic (passive stations), with a view of reducing their impact on the network. An example is provided in the IEEE 802.11-20/1046r2 document where a regular non-AP station shall stop its transmission opportunity, TXOP, before a protected/restricted TWT service period (for LLRS traffic) starts. The LLRS traffic transmission may thus take place without waiting the end of the pending TXOP, hence ensuring low latency.

However, non-AP stations that have no LLRS capability, e.g. legacy non-AP stations complying with one of the previous IEEE 802.11 standard specification including 802.11a, 802.11b, 802.11g, 802.11n, 802.11ac or 802.1ax, may coexist with LLRS capable stations in the same BSS or at least operate over the same wireless medium (e.g. 20 MHz channel). Such LLRS not-capable non-AP stations cannot give the wireless medium back, by stopping an ongoing TXOP. This dramatically impacts the latency performance of the network as a LLRS-capable non-AP station must wait the whole ongoing TXOP, sometimes longer than the required latency, before accessing the medium.

An efficient network management is thus required to improve latency for LL reliable services.

SUMMARY OF INVENTION

A proposed key issue to improve latency is to guarantee the LLRS capable non-AP stations have often enough opportunities to access the wireless medium, given latency requirements.

This objective may be achieved by adapting the length of the TXOP, should LLRS data traffic occurring on the wireless medium.

In this respect, the present invention thus proposes a communication method in a wireless network, comprising at an access-point, AP, managing one or more Basic Service Sets, BSSs:

setting Enhanced Distributed Channel Access, EDCA, parameters for a first BSS (i.e. EDCA parameters to be applied by non-AP stations of the first BSS to access a wireless medium and transmit frames), and upon detecting low latency reliable service, LLRS, activity in the one or more BSSs, modifying the EDCA parameters for the first BSS.

The AP is thus able to detect LLRS activity in one of the BSSs it manages and responsively to modify the communication parameters of the stations in one (or more) BSS. Consequently, by choosing appropriate modified communication parameters for the first BSS, the AP can force the non-AP stations to limit their TXOP over time, hence increasing the access opportunities on the wireless medium for the LLRS capable stations.

Optional features of embodiments of the invention are defined in the appended claims. Some of these features are explained here below with reference to a method, while they can be transposed into device features.

In some embodiments, the modified EDCA parameters includes a modified Transmission Opportunity, TXOP, limit parameter that defines a maximum duration of a TXOP. The AP thus directly controls the maximum duration the LLRS not-capable stations of the first BSS are allowed to reserve the wireless medium. The AP may thus guarantee LLRS capable stations will have new medium access opportunities with a minimum frequency corresponding to the prescribed maximum duration.

In particular embodiments, the modified TXOP limit parameter is lower than the TXOP limit parameter of the EDCA parameters before modification. This aims at reducing the maximum duration of an access to the wireless medium by the non-AP station of the BSS.

For instance, the (lower) TXOP limit parameter may be one from:

half a value of a worst-case latency budget for LLRS data traffic as defined in the document "IEEE 802.11 Real Time Applications TIG Report", referenced IEEE 802.11-18/2009r6, for instance the lowest non-zero value, a TXOP limit value from table 9-137 of IEEE 802.11 Standard®, version 2016, or from table 8-105 of IEEE 802.11 Standard®, version 2012, that is lower than a worst-case latency budget for LLRS data traffic as defined in the document "IEEE 802.11 Real Time Applications TIG Report", referenced IEEE 802.11-18/2009r6, a ratio between a worst-case latency budget for LLRS data traffic as defined in the document "IEEE 802.11 Real Time Applications TIG Report", referenced IEEE 802.11-18/2009r6 and a number that is based (e.g. identity) on a number of non-AP stations having no LLRS capability (i.e. not implementing LLRS) in the first BSS, value 0, i.e. restricting the TXOP to the transmission of a single MAC service data unit, MSDU, or management frame, a value equal to 1.024 ms that meets the requirements of the above-cited document "IEEE 802.11 Real Time Applications TIG Report" while limiting the impact on the station throughput when there is LLRS activity, a value equal or lower than Delay Bound values indicating, in TSPEC information elements managed by the AP and received from LLRS capable non-AP stations, maximum amounts of time to complete successful transmissions, and a value equal or lower than ratios, each between a Delay Bound value indicating, in a TSPEC information element managed by the AP and received from a LLRS capable non-AP station, a maximum amount of time to complete a successful transmission and an integer N increased from 1 in case of retransmission policy.

In some embodiments, the TXOP limit parameter has the same value for different access categories of traffic data. This eases the management of the TXOP duration when LLRS activity is running in the network.

In variants, the lower TXOP limit parameter has different values for different access categories of traffic data. This allows keeping QoS for legacy (i.e. not LLRS) communications.

In some embodiments, the method further comprises, upon detecting an end of the LLRS activity in the one or more BSSs, restoring (i.e. modifying back) the set EDCA parameters for the first BSS. That means the AP resets the first BSS with the previously used EDCA parameters. Of course, the AP may use another and new set of EDCA parameters, for instance due to changes in the network. Therefore, more generally, the AP sets new EDCA parameters with a higher TXOP limit parameter (than the modified one used when LLRS data traffic exists).

In some embodiments, detecting LLRS activity in the one or more BSSs includes detecting LLRS activity in the first BSS. This means LLRS capable and not-capable stations coexist in the same BSS. The adaptation of the EDCA parameters therefore impacts both types of non-AP stations.

In variants, detecting LLRS activity in the one or more BSSs includes detecting LLRS activity in another BSS managed by the AP than the first BSS. In that case, the AP advantageously only degrades the EDCA parameters (TXOP limit) for the not-LLRS BSS. Long TXOP may survive in the other BSS dedicated to LLRS data traffic, since the LLRS capable stations are able for instance to interrupt or stop an on-going TXOP, should a LLRS transmission be starting. In other words, EDCA parameters for the other BSS remain unchanged upon detecting the LLRS activity.

In some embodiments, detecting LLRS activity in the one or more BSSs includes detecting one or more criteria from:

receiving LLRS capability for a non-AP station in the one or more BSSs. This means the AP may consider there is LLRS activity as soon as it is aware a LLRS capable station is present (associated with the AP) in the network, exchanging LLRS data traffic (i.e. UpLink or DownLink traffic) with a non-AP station in the one or more BSSs, preferably data traffic carrying a predefined Traffic Identifier or of a predefined access category (e.g. AC_VI or AC_VO). Here the AP considers there is LLRS activity as long as it is involved in LLRS data traffic exchanges, receiving, from a non-AP station, a message signaling LLRS data traffic requirements or needs, for instance a TSPEC message with a specified latency lower than a predefined TXOP limit (e.g. the TXOP limit set in the EDCA parameters of the BSS).

Conversely, detecting an end of the LLRS activity may correspond to the disassociation of all the LLRS capable non-AP stations from the AP, the end of a LLRS data traffic exchange with non-AP stations or the end of stations' needs or requirements in terms of LLRS.

In some embodiments, setting the EDCA parameters for the first BSS includes broadcasting a beacon frame including the EDCA parameters. In variants, setting the EDCA parameters for the first BSS includes sending a probe response frame including the EDCA parameters to a probe requesting non-AP station.

In some embodiments, modifying the EDCA parameters for the first BSS includes broadcasting a beacon frame including the modified EDCA parameters. The AP thus broadcasts the new EDCA values to all the non-AP stations of the first BSS, for the latter to apply the modified parameters.

In some embodiments, the EDCA parameters for the first BSS includes legacy EDCA parameters and Multi-User EDCA parameters temporary substituting the legacy EDCA parameters for a non-AP station of the first BSS when the non-AP station is scheduled by the AP in a multi-user transmission. The present invention thus impacts the TXOP length whatever the station's state.

The objective mentioned above may also be achieved by directing the non-AP stations to appropriate BSSs, either dedicated to LLRS traffic data or not.

In this context, the method may further comprise, at the AP, transmitting, to a non-AP station, an association-related management frame refusing an association of the non-AP station with the first BSS or disassociating the non-AP station from the first BSS, wherein the association-related management frame includes a code indicating another BSS managed by the AP is available. Thanks to the code, the AP may redirect the non-AP station to a BSS corresponding for instance to its capabilities.

Better management of the transmissions by the stations can be achieved. Indeed, modified EDCA parameters (reduced TXOP limit) may be used for the LLRS not-capable stations (grouped within the same BSS) to reduce their transmission times. Furthermore, conventional EDCA parameters (hence TXOP limit) may be used for the LLRS capable stations (grouped within the same BSS) to offer longer legacy contention free TXOPs, as long as they are able to interrupt them (through LL active measures) and then allow LLRS transmissions to take place.

The use of such a code may be implemented alone, regardless of modifying the EDCA parameters as mentioned above. To that end, the invention may also concern a communication method in a wireless network, comprising at an access-point, AP:

transmitting, to a non-AP station, an association-related management frame refusing an association of the non-AP station with a first Basic Service Set, BSS, managed by the AP or disassociating the non-AP station from the first BSS, wherein the association-related management frame includes a code indicating another BSS managed by the AP is available.

Conversely, a communication method in a wireless network may comprise at a non-access-point, non-AP, station:

receiving, from an AP, an association-related management frame refusing an association of the non-AP station with a first Basic Service Set, BSS, managed by the AP or disassociating the non-AP station from the first BSS, wherein the association-related management frame includes a code indicating another BSS managed by the AP is available.

In some embodiments, the method may further comprise, at the AP:

receiving capabilities from the non-AP station, determining whether a capability of the non-AP station matches a capability of the first BSS with respect to a low latency reliable service, LLRS, wherein transmitting the association-related management frame is responsive to determining no match.

The code thus warns the station it is not compatible with the first BSS, but another more-compatible BSS exists. Of course, the AP may authorise the association with the first BSS, should the capabilities between the station and the BSS match.

For instance, the non-AP station may be LLRS capable and the first BSS be dedicated (i.e. restricted) to LLRS not-capable non-AP stations, i.e. to non-LLRS data traffic. In that case, the code thus indicates that the first BSS is dedicated to low latency reliable service, LLRS, not-capable non-AP stations and another BSS dedicated to LLRS capable non-AP stations that is managed by the AP is available for the LLRS capable station.

To the opposite, the non-AP station may be not LLRS capable and the first BSS be dedicated to LLRS capable non-AP stations. In this opposite case, the code indicates that the first BSS is dedicated to low latency reliable service, LLRS, capable non-AP stations and another legacy BSS dedicated to LLRS not-capable non-AP stations that is managed by the AP is available for the LLRS not-capable station.

In some embodiments, the method further comprises, at the AP, initiating the other BSS responsive to receiving a LLRS capability from the non-AP station. Preferably, the other BSS is, in this case, a LLRS capable BSS (i.e. dedicated for LLRS data traffic). Hence, upon having a first LLRS capable station, the AP decides to implement a dedicated BSS, to ensure an appropriate management of the EDCA parameters (as described above) for the LLRS not-capable stations. The LLRS capable stations may then be directed to this newly initiated BSS, using transmission of the above code.

In other embodiments, the method further comprises, at the AP upon detecting LLRS activity in the network, restricting the first BSS to LLRS capable non-AP stations or restricting the first BSS to LLRS not-capable non-AP stations. In this configuration, the AP may implement a BSS without any constraint, and decide to restrict it to LLRS capable stations only (or not-capable). In this case, the LLRS not-capable (or capable) stations may then be directed to another BSS, using transmission of the above code.

In some embodiments, the method further comprises, at the non-AP station after the receiving, transmitting an association request to the AP to associate with another BSS managed by the AP. Conversely, the method further comprises, at the AP after the transmitting, receiving an association request from the non-AP station to associate with another BSS managed by the AP. In this way, the AP succeeded in redirecting the non-AP station to a more appropriate BSS, meaning a capability of the non-AP station preferably matches a capability of the other BSS with respect to LLRS.

To have knowledge of the various BSSs available, the method may further comprise, at the non-AP station, receiving from the AP one or more beacon frames advertising the first BSS and the other BSS. The beacon frame may be a multi-BSS beacon frame sent by the transmitted AP and advertising of multiple (e.g. all) BSSs instantiated by the AP. This allows the non-AP station to efficiently find another appropriate BSS, with a view of associating with it.

Of course, the AP may manage various BSSs and perform the above steps with respect to various non-AP stations in the BSSs, for instance to try to have the LLRS capable stations in dedicated BSSs and the LLRS not-capable stations in other BSSs.

The objective mentioned above may also be achieved by controlling Direct Link (DiL) or Peer-to-peer (P2P) with adapted TXOP lengths.

In this respect, the present invention also proposes a communication method in a wireless network, comprising at a non-access-point, non-AP, station associated with a first Basic Service Set, BSS, managed by an AP:

receiving Enhanced Distributed Channel Access, EDCA, parameters for the first BSS, the EDCA parameters including a TXOP limit parameter that defines a maximum duration of a transmission opportunity, TXOP, within the first BSS. The station thus belongs to a BSS and is aware of transmission parameters to respect when communicating within the BSS, negotiating, based on the TXOP limit parameter, a duration of TXOP with another non-AP station for direct link, DiL, transmission, and performing a DiL transmission with the other non-AP station.

In that way, although the DiL transmission does not take place within the first BSS but over the same wireless medium as the first BSS, the (P2P) non-AP station forces the other P2P station to limit its TXOP duration to the current requirements provided by the AP. Hence, the latency impacted by the P2P transmissions is still control by the AP. Indeed, the latter may adapt the EDCA parameters (incl. TXOP limit) as mentioned above, depending on whether LLRS activity is sensed or detected.

In some embodiments, the other (P2P) non-AP station is a non-AP station un-associated with the AP in the first BSS. The invention thus controls any DiL transmission involving a non-AP station associated with the AP.

In some embodiments, negotiating the TXOP duration includes receiving a TXOP duration from the other non-AP station and replying with a reduced TXOP duration given the TXOP limit parameter. The non-AP station associated with the AP thus takes control over the other P2P (un-associated) station.

Correlatively, the invention also provides a wireless communication device comprising at least one microprocessor configured for carrying out the steps of any of the above methods.

Another aspect of the invention relates to a non-transitory computer-readable medium storing a program which, when executed by a microprocessor or computer system in a wireless device, causes the wireless device to perform any method as defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

Figure 1:
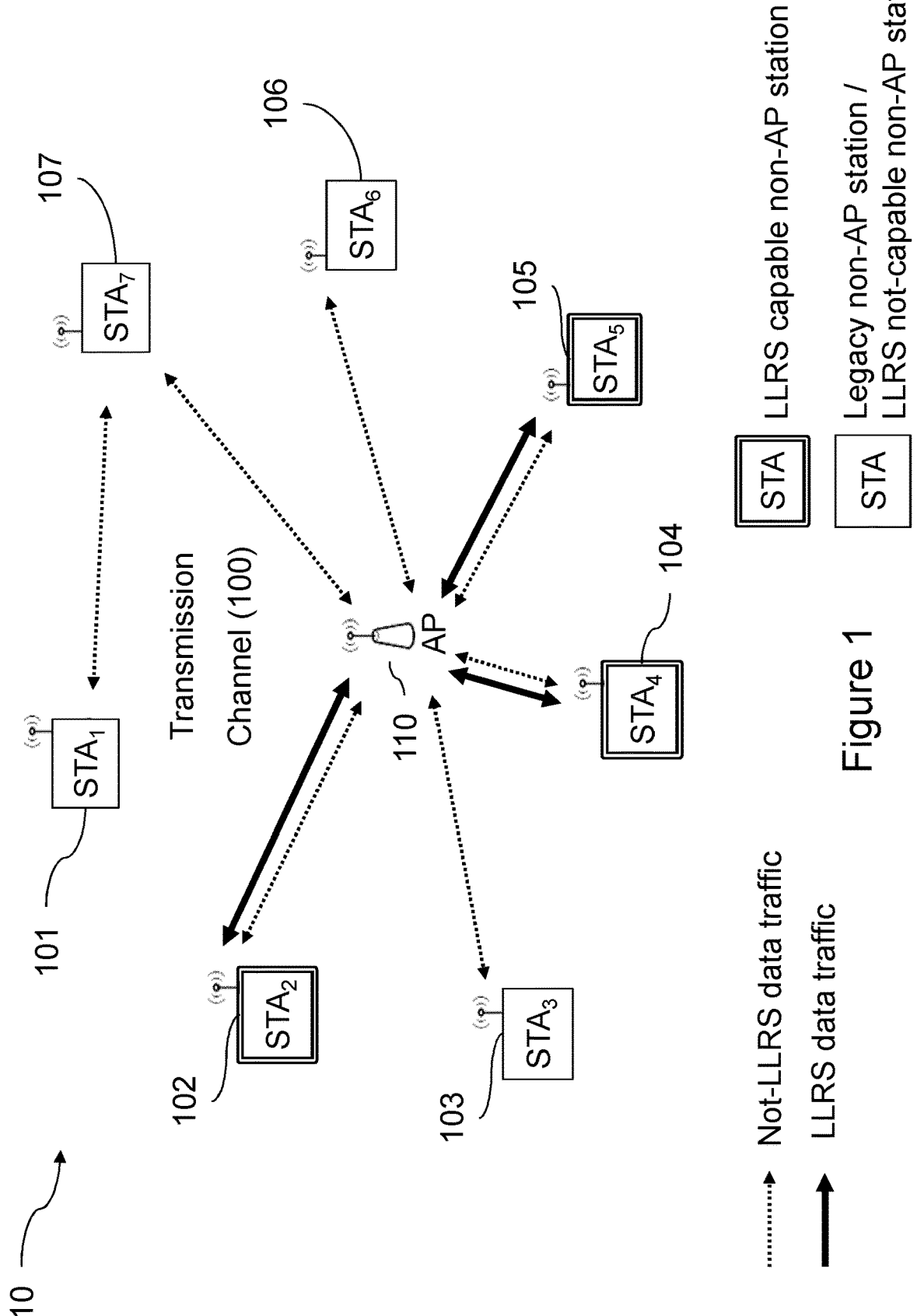
FIG. 1 illustrates a network environment in which embodiments of the invention may be implemented.

The invention will now be described by means of specific non-limiting exemplary embodiments and by reference to the figures.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. A SDMA system may utilize sufficiently different directions to simultaneously transmit data belonging to multiple user terminals, i.e. wireless devices or stations. A TDMA system may allow multiple user terminals to share the same frequency channel by dividing the transmission signal into different time slots or resource units, each time slot being assigned to different user terminal. An OFDMA system utilizes orthogonal frequency division multiplexing (OFDM), which is a modulation technique that partitions the overall system bandwidth into multiple orthogonal sub-carriers or resource units. These sub-carriers may also be called tones, bins, etc. With OFDM, each sub-carrier may be independently modulated with data. A SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers.

The teachings herein may be incorporated into (e.g., implemented within or performed by) a variety of apparatuses (e.g., stations). In some aspects, a wireless device or station implemented in accordance with the teachings herein may comprise an access point (so-called AP) or not (so-called non-AP station or STA).

An AP may comprise, be implemented as, or known as a Node B, Radio Network Controller ("RNC"), evolved Node B (eNB), 5G Next generation base station (gNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A non-AP station may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, a STA may comprise a cellular telephone, a cordless telephone, a Session Initiation Protocol ("SIP")

phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the non-AP station may be a wireless node. Such wireless node may provide, for example, connectivity for or to a network (e.g., a wide area network such as the Internet or a cellular network) via a wired or wireless communication link.

An AP manages a set of stations that together organize their accesses to the wireless medium for communication purposes. The stations (including the AP) form a service set, here below referred to as basic service set, BSS (although other terminology can be used). A same physical station acting as an access point may manage two or more BSS (and thus corresponding WLANs): each BSS is thus uniquely identified by a specific basic service set identification, BSSID and managed by a separate virtual AP implemented in the physical AP.

Low latency reliable services, LLRS, are services provided to a higher layer traffic stream that prioritize and deliver MSDUs (data units of this traffic stream) within a worst-case latency budget with a given reliability/packet delivery ratio (PDR) and low jitter. Traffic that may be concerned by LLRS includes latency sensitive data, i.e. data from applications such as gaming, media streaming, augmented reality, virtual reality, and so on.

The 802.11be Project Authorization Request (PAR) gives examples of worst-case latencies, for instance 5 ms for realtime gaming.

A communication network should adopt appropriate measures, referred here below to as LLRS or low latency or LL measures, to ensure the LLRS traffic has indeed priority over not-LLRS traffic in the network. Some LL measures may be active measures in that they are to be applied by stations exchanging LLRS traffic in the network. Some LL measures may be passive measures in that they are to be applied by passive non-AP stations, i.e. those of the BSS that do not participate in the LLRS traffic exchange. The passive measures reduce use of the wireless network for exchange of not-LLRS traffic, hence prioritizing the LLRS traffic. Such prioritization favors achievement of PDR and low jitter targets.

The AP of a BSS may declare the LLRS requirements for the non-AP stations to join the BSS, such as the LL measures the non-AP stations will have to apply. A dedicated information element can be used in a management frame, with dedicated bits to declare for instance active and/or passive LL measures to be applied.

A non-AP station wishing to join the BSS can declare its LLRS capabilities, i.e. its capability to implement LL measures (in general or those or some as declared by the AP) when appropriate. The declaration may be made during the association procedure with the BSS in such a way the AP may decide whether to authorize or refuse the requested association based on the declared capabilities. Such non-AP station are referred below to as LLRS capable stations.

On the opposite, those having no LLRS capabilities are referred to as LLRS not-capable stations. They include legacy non-AP stations complying with one of the previous IEEE 802.11 standard specification including 802.11a, 802.11b, 802.11g, 802.11n, 802.11ac or 802.1ax.

LLRS capable and not-capable non-AP stations coexist and share the same wireless medium. While LLRS capable stations can stop an ongoing legacy contention free transmission to let the wireless medium for LLRS transmissions, this is not the case for the LLRS not-capable stations. It results that LLRS transmissions may wait for a long time before starting, due to an ongoing legacy contention free transmission by a LLRS not-capable station.

The present invention seeks to have a better control over such ongoing legacy contention free transmissions by LLRS not-capable stations, in order to improve transmission latency, in particular with respect to LLRSs.

FIG. 1 illustrates an exemplary network environment 10 for delivering LLRS traffic, in accordance with one or more example embodiments.

Each communication station 101-107 registers to a central station or access point (AP) 110 during an association procedure where the AP assigns a specific Association IDentifier (AID) to the requesting non-AP station. For example, the AID, e.g. a 16-bit value uniquely identifying the non-AP station, is used to identify the stations in the frame exchanged. The AP 110 and the associated non-AP stations 101-107 may represent a basic service set (BSS) or an extended service set (ESS).

Figures 3, 5, 6:
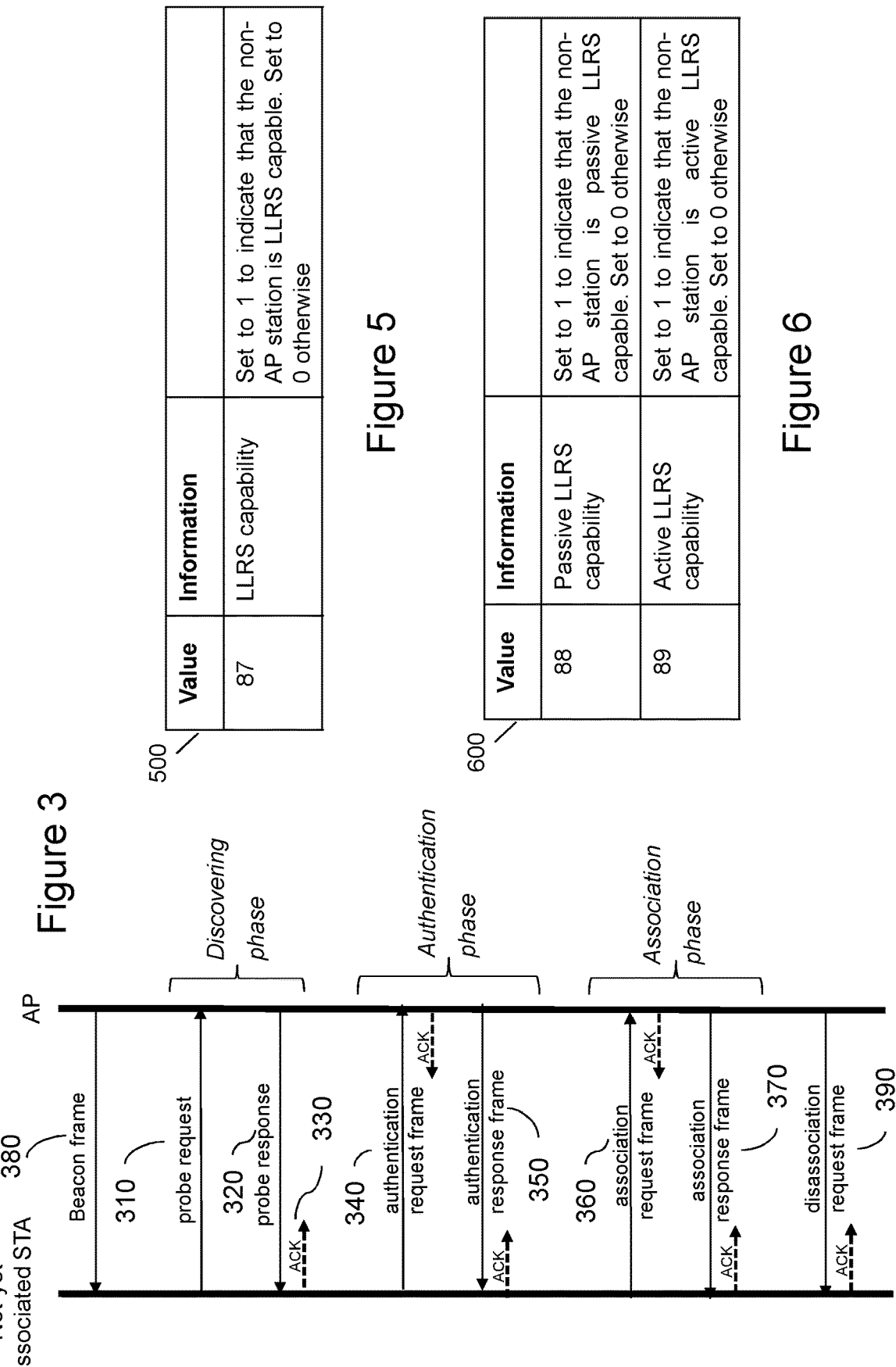
FIG. 3 illustrates an exemplary sequence of management frames allowing a not-yet-associated station to discover and register with an AP managing a BSS.
FIGS. 5 and 6 illustrate various signalling implementations for declaring LLRS capabilities.

An exemplary association procedure is illustrated in FIG. 3, discussed below.

Once associated with the BSS, the communication stations 101-107, 110 exchange data frames over a radio transmission channel 100 of a wireless local area network (WLAN), under the management of the AP 110. The radio transmission channel 100 is defined by an operating frequency band constituted by a single channel or a plurality of channels forming a composite channel.

Non-AP stations may also communicate directly via a direct wireless link (DiL for direct link), i.e. without the intervention of the AP as relay of their messages. Exemplary situation of direct communications includes the presence of peer-to-peer (P2P) transmissions between non-AP stations having the same primary channel. Non-AP stations 101 and 107 exchange data frames via direct link and one of those two P2P stations operates as an AP station for this P2P exchange.

Figure 9:
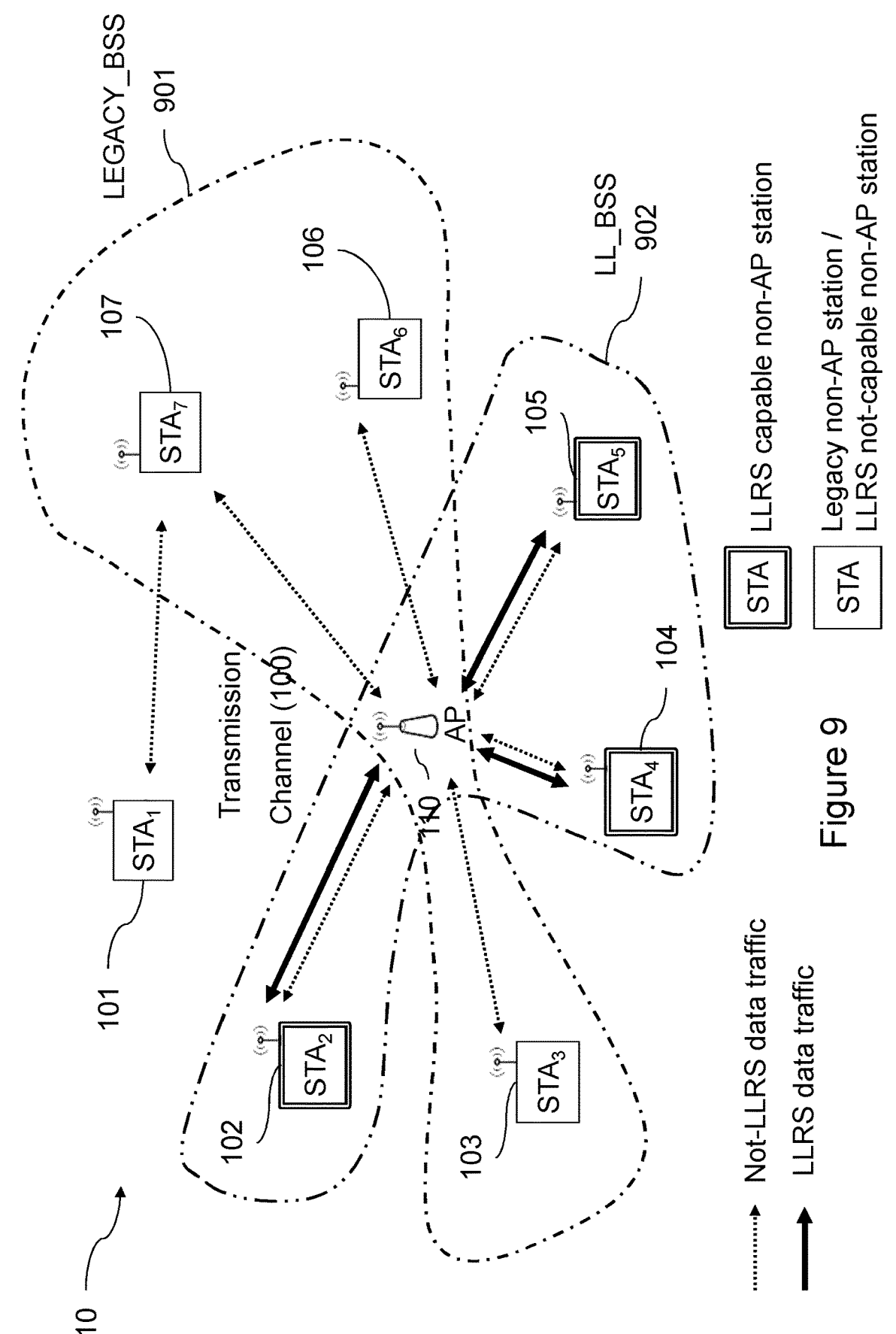
FIG. 9 illustrates another network environment in which embodiments of the invention may be implemented.

A physical access point 110 may be configured to manage two or more WLANs or BSSs, i.e. two or more groups of stations (see for instance the embodiment of FIG. 9). Each BSS is uniquely identified by a specific basic service set identifier, BSSID, and managed by a respective virtual AP implemented in the physical AP. Within the context of a multiple BSSID set, one virtual AP is referred to as the 'transmitted' BSSID or BSS (only one per the multiple set) if the AP emits beacon frames. Other BSSIDs of the AP belonging to a multiple BSSID set are 'nontransmitted' BSSIDs or BSSs. A beacon frame sent by the transmitted BSSID includes the basic profiles and each profile elements that are mandatory for the nontransmitted BSSID, including the EDCA and/or MU-EDCA parameters as discussed below.

The stations 101-107, 110 compete one against the other using EDCA (Enhanced Distributed Channel Access) contention, to gain access to the wireless medium 100 in order to be granted a so-called legacy contention free transmission opportunity (TXOP—or "contention free burst period") and then transmit (single-user, SU) data frames over the wireless medium during the TXOP duration.

The stations may also use a multi-user (MU) scheme in which a single station, usually the AP 110, is allowed to schedule a MU transmission, i.e. multiple simultaneous transmissions to or from other stations, during a TXOP granted to it using EDCA contention in the wireless network. One implementation of such a MU scheme has been for example adopted in IEEE 802.11ax amendment standard, as the Multi-User Uplink and Downlink OFDMA (MU UL and DL OFDMA) procedures.

Access to the shared radio medium to send data frames is primarily based on the CSMA/CA technique, for sensing the carrier and avoiding collision by separating concurrent transmissions in space and time. Carrier sensing in CSMA/CA is performed by both physical and virtual mechanisms. Physical carrier sensing resides in the PHY layer of any station and uses energy detect and preamble detect with frame length deferral to determine when the medium is busy. Virtual carrier sensing resides in the MAC layer and uses reservation information carried in the Duration field of the MAC headers announcing impeding use of the medium. The virtual carrier sense mechanism is called the network allocation vector (NAV). The medium is determined to be idle only when both the physical and virtual carrier sense mechanisms indicate it to be so.

To access the medium (EDCA contention), any station, including the AP, starts counting down a backoff counter (designed to expire after a number of timeslots) when the medium is sensed as idle at least after a predefined period (e.g. SIFS, PIFS, DIFS or AIFS period depending on the frame type). The backoff counter is chosen randomly in a so-called contention window [0, CW], where CW is an integer selected between $CW_{min}$ and $CW_{max}$ (power of 2 less 1 values). This backoff mechanism or procedure, also referred to as Distributed Coordination Function (DCF) contention-based channel access scheme, is the basis of the collision avoidance mechanism that defers the transmission time for a random interval, thus reducing the probability of collisions on the shared channel. After the backoff time expires (i.e. the backoff counter reaches zero), the station may send data or control frames if the medium is still idle. These frames reserve the wireless medium 100 for a TXOP duration indicated in the Duration field of the MAC header (more precisely in the HE-SIG-A field for HE frames).

Once a station has gained access to the medium, it maintains control of the medium by keeping a minimum gap, the short inter-frame space (SIFS), between frames in a sequence. The successive frames may indicate, in the longer than SIFS. By this way, the stations, involved in a TXOP, can be sure that no frames will be transmitted by other stations till the end of the TXOP.

Rules limit the types of frame exchange sequences that are allowed and the duration of those sequences to prevent one station from monopolizing the medium.

Parameters governing the EDCA contention and these rules are known as EDCA parameters and are defined per BSS by the AP. They are transmitted to the non-AP stations of the BSS via the beacon frames the AP sends or via so-called probe response frames sent by the AP when the non-AP station tries to associate with the BSS (Figure XX discussed below).

Figures 2, 4:
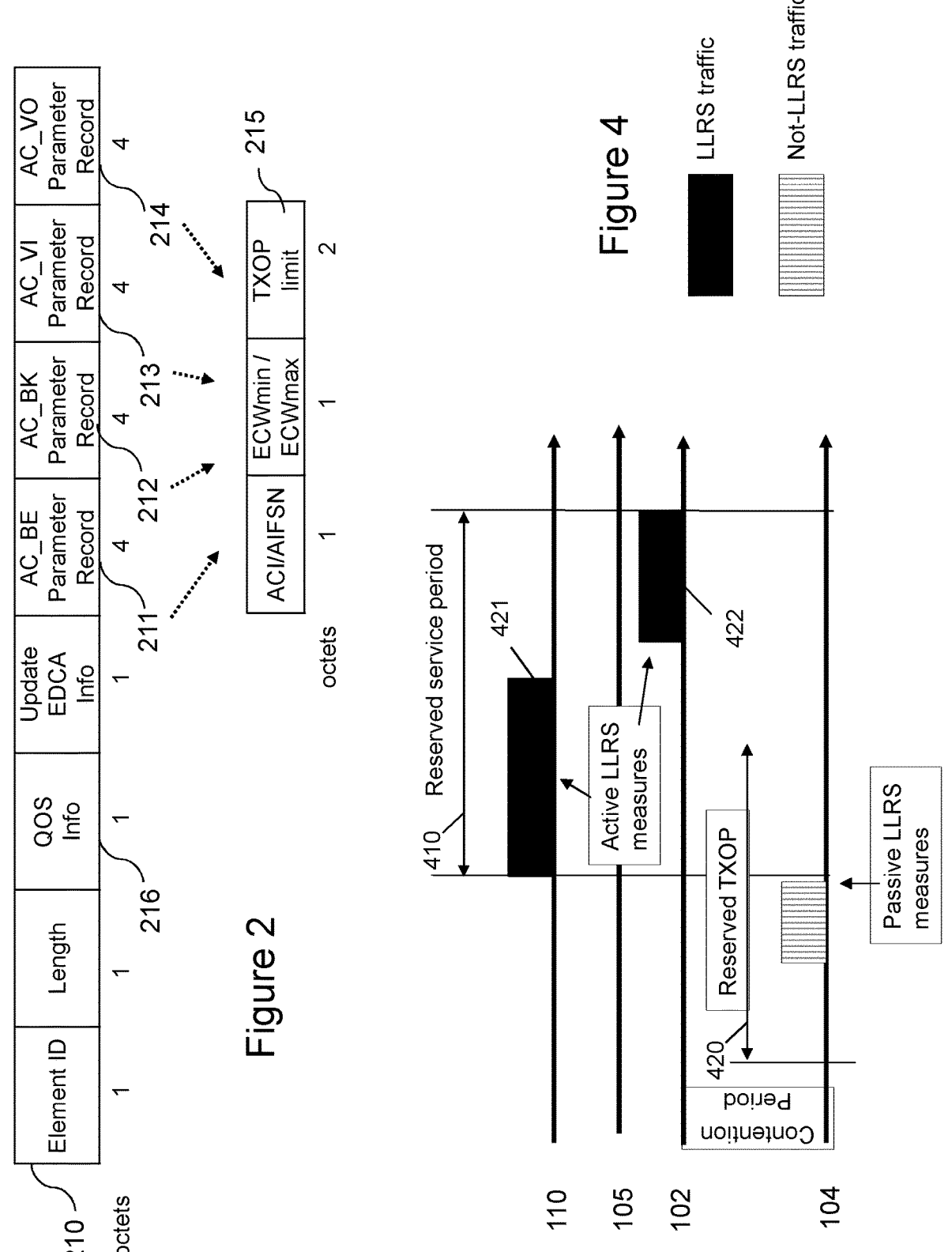
FIG. 2 illustrates an EDCA Parameter Set information element as exchanged in 802.11 networks to provide EDCA parameters for a BSS.
FIG. 4 illustrates some LL measures taken in a BSS in an exemplary scenario where LLRS traffic is transmitted.

The EDCA parameters are provided through an EDCA Parameter Set information element (IE) 210, as described in FIGS. 9-261 and 9-262 of IEEE 802.11 Standard®, version 2016, and reproduced in FIG. 2, The EDCA parameters includes a minimum contention window $CW_{min}$ (or $ECW_{min}$), a maximum contention window $CW_{max}$ (or $ECW_{max}$), an AIFSN value (defining the AIFS period mentioned above) and a TXOP limit value specifying the maximum allowed duration for a solicited TXOP.

As shown in the Figure, these parameters may be provided per each access category, AC_BE (through field 211), AC_BK (212), AC_VI (213), AC_VO (214) as defined in standard 802.11e-2005. This means that any obtained TXOP is a bounded period during which a station may transfer data of a particular traffic class (AC). Once the TXOP has been obtained, the station may continue to transmit data, control, and management frames and receive response frames, provided the frame sequence duration does not exceed the TXOP limit set (field 215) for that AC. To be noted that a TXOP limit of zero means that only one MSDU or management frame can be transmitted before competing again for access.

The AP can update the AC parameters at any time by using the QoS Info field 216. The QoS Info field 216 contains the EDCA Parameter Set Update Count subfield, which is initially set to 0 and is incremented each time any of the AC parameters changes. This subfield is used by the non-AP STAs receiving a new EDCA Parameter Set information element (IE) 210 to determine whether the EDCA parameter set has changed or not, and accordingly updates its local values to use them for the next data transmission.

The following table provides default values for the EDCA parameters for various 802.11 standards, as defined in table 9-137 of IEEE 802.11 Standard®, version 2016, and table 8-105 of IEEE 802.11 Standard®, version 2012.

TABLE 1

| | | | | default values for EDCA parameters | | | |
| --- | --- | --- | --- | --- | --- | --- | --- |
| | | | | | TXOP limit | | |
| | | | | | 802.11REVmd ™/D5.0 | | |
| AC | $ECW_{min}$ | $ECW_{max}$ | AIFSN | 802.11n | DSSS | OFDM (ERP, HT, VHT) | 802.11ac |
| AC_BK | 31 | 1023 | 7 | 0 | 3.264 ms | 2.528 ms | 0 |
| AC_BE | 31 | 1023 | 3 | 0 | 3.264 ms | 2.528 ms | 0 |
| AC_VI | 15 | 31 | 2 | 3.008 ms | 6.016 ms | 4.096 ms | 22.56 ms |
| AC_VO | 7 | 15 | 2 | 1.504 ms | 3.264 ms | 2.080 ms | 11.28 ms |
| non-QOS | 15 | 1023 | 2 | 0 | 0 | 0 | 0 |

Duration field, the remaining duration of the current TXOP. Another station will not gain access to the medium during that sequence since it must defer for a fixed duration that is 802.11ax standard introduced an additional set of EDCA parameters, namely MU EDCA parameters in order to restore fairness between non-AP stations involved in MU transmission with the AP and those stations not involved. The MU EDCA parameters temporary substitute the legacy EDCA parameters for a non-AP station of the BSS when the non-AP station is scheduled by the AP in a multi-user transmission.

The MU EDCA parameters are also transmitted by the AP to the non-AP stations of the BSS via beacon frames and/or probe response frames. The format of the MU EDCA Parameter Set information element is described in FIGS. 9-788o and 9-788p of the 802.11ax D6.1 standard. It is quite similar to the format of FIG. 2 except that a MU EDCA Timer field replaces the TXOP limit field 615. It means that the TXOP limit provided in the legacy EDCA parameters should apply when using the MU EDCA parameters.

FIG. 3 illustrates an exemplary sequence of management frames allowing a not-yet-associated non-AP station to discover and register with an AP managing a BSS. It comprises three phases: WLAN discovery, authentication and association, at the end of which the non-AP station enters into an authenticated and associated state with the AP, should the AP authorizes the association. Note that the station may be currently associated with another AP (of another BSS) and willing to join this BSS.

Prior to association with the AP, the non-AP stations gather information about the APs by scanning the channels one by one either through passive scanning (passive discovery procedure) or active scanning (active discovery procedure).

In the passive scanning mode, the station scans through successively each 20 MHz channel and waits to listen for beacon frames (declaring SSID—service set identifier of the BSSs) on the scanned channel, regardless of whether the stations have already connected to a specific BSS before or not.

The beacon frame is a management frame advertising details of the BSS. It is periodically sent over the wireless medium by the AP, for instance each 100 ms.

In the active scanning mode, the stations send out probe request frames 310 on each wireless 20 MHz channel. The probe request frames may contain the SSID of a specific BSS or WLAN that the station is looking for or the probe request frames may not contain a specific SSID meaning the station is looking for "any" BSS in the vicinity of the station.

In response to receiving a probe request frame, the AP checks whether the station has at least one common supported data rate or not. If there is a compatible data rate, the AP responds with a probe response frame 320, the content of which is similar to a beacon frame: advertising of the SSID (wireless network name), of supported data rates, of encryption types if required, and of other 802.11 capabilities of the AP including (MU-)EDCA parameters sets values to be used to perform further data transmission using EDCA.

An acknowledgment frame 330 may be sent by the station, in response to receiving the probe response frame 320.

According to embodiments of the invention, the AP may use the beacon frame 380 and the probe response frame 320 to advertise and update dynamically EDCA parameters sets values to be used by non-AP stations joining the BSS.

At the reception of the beacon frame or of the probe response frame, the non-AP station may decide to initiate or not the association procedure with the given BSS.

The second phase is the 802.11 authentication once a BSS to join has been chosen by the station. As a well-known conventional authentication phase is run, it is not described in details. The station sends a low-level 802.11 authentication request frame 340 to the selected AP. The AP receives the authentication request frame 340 and responds to the station with an authentication response frame 350.

Next, the station has to perform actual association with the AP from the low-level authentication step. This is the next phase of actual 802.11 association by which the station actually joins the BSS, if the AP agrees with. This stage finalizes the security and bit rate options and establishes the data link between the station and the AP. The purpose of this final exchange is for the station to obtain an Association Identifier (AID) to be used to access the medium and send data within the joined BSS.

To that end, the station sends an association request frame 360 to the selected AP. The association request frame contains chosen encryption types if required and other compatible 802.11 capabilities. The association request frame 360 is a management frame.

If the elements in the association request frame match the capabilities of the AP, the AP creates an Association ID (AID) for the station and responds with an association response frame 370 with a success message granting network access to the station. In case of no match, an association refusal may be issued.

More generally, the AP may authorise or refuse an association of the non-AP station with the BSS based on the received declaration of capabilities. To that end (authorization or refusal), result codes are provided in the association response frame 370. Exemplary codes are listed in section 6.3.7.5.2 of IEEE 802.11 Standard®, version 2016, for instance SUCCESS, REFUSED_REASON_UNSPECIFIED, REFUSED_CAPABILITIES_MISMATCH, REFUSED_EXTERNAL_REASON, REFUSED_AP_OUT_OF_MEMORY, REFUSED_BASIC_RATES_MISMATCH, REJECTED_EMERGENCY-_SERVICES_NOT_SUPPORTED, REFUSED_TEMPORARILY.

Once the station is successfully associated with the AP, data transfer can start in the chosen BSS using the physical medium 100.

Once associated, a non-AP station and an AP can also disassociate unliterally by sending a disassociation frame 390. Reason codes are also provided in the dissociation frame 390. Numerous exemplary codes are listed in section 9.4.1.2 of IEEE 802.11 Standard®, version 2016. Disassociation cannot be refused by either party.

The probe response frame 320, authentication request/response frames 340 and 350, association request/response frames 360 and 370 and disassociation request frame 390 are unicast management frames emitted in an 802.11 legacy format, known as a single user (SU) format. This is a format used for point-to-point communication (here between the AP and the station). Each of these unicast management frames can be acknowledged by an ACK frame 330.

Back to FIG. 1, the non-AP stations may represent various devices such as gaming client, augmented/virtual reality headset, smartphones, wireless display and some of them have to exchange (i.e. transmit or/and receives) low-latency or LLRS data traffic over time. LLRS data traffic has more constrained QoS requirements regarding for instance PDR, jitter and latency, than not-LLRS traffic coexisting in the WLAN 10.

As an example, document "IEEE 802.11 Real Time Applications TIG Report", referenced IEEE 802.11-18/200916, provides the following latency requirements for LLRS (real time):

Real-time gaming: latency lower than 5 ms

Cloud gaming: latency lower than 10 ms

Real-time video: latency lower than 3 to 10 ms

In robotics and industrial automation, equipment control and human safety: latency lower than 1 to 10 ms; haptic technology: latency lower than 1 to 5 ms.

Some non-AP stations 102, 103, 105 are LLRS capable and can participate to prioritize LLRS traffic over not-LLRS traffic, LL or LLRS measures can be implemented within the BSS: active LL measures for the stations (referred to as active stations) exchanging the LLRS traffic and passive LL measures for the non-AP stations (referred to as passive stations) not participating in the LLRS traffic exchange at a given time. The non-AP stations 102, 103, 105 may become successively active and passive stations within the same BSS. The non-AP stations 102, 103, 105 are LLRS capable.

The non-AP stations 103, 106, 107 are not implementing the LLRS features. The non-AP stations 103, 106, 107 are LLRS not-capable. The non-AP stations 103,106,107 can be legacy stations complying to a previous version of IEEE 802.11 standard specification not including the LLRS (802.11a, 802.11b, 802.11g, 802.11n, 802.11ac or 802.11ax) or stations not supporting LLRS (for example, if it is considered optional in the next 802.11 release).

FIG. 4 illustrates some LL measures taken in the BSS in an exemplary scenario where LLRS traffic is transmitted.

In this scenario, the AP schedules a reserved service period 410. It may announce the starting time and the ending time of the period. The reserved service period 410 may be fully dedicated to LLRS traffic exchange, or in variant may allow both LLRS traffic and not-LLRS traffic. In the figure, it is a reserved LLRS period.

The AP participates to the LLRS traffic exchange (sends 421 to non-AP station 105 and then receives 422 from non-AP station 102) in the reserved service period. However, this is not mandatory. The reserved LLRS period may alternatively be used by non-AP stations to directly exchange P2P LLRS traffic.

In one embodiment, the reserved service period is a protected TWT service period as presented in the IEEE 802.11-20/1046r2 document.

Prior to the reserved service period, non-AP station 104 gains access to the wireless medium 100 for a TXOP duration and starts transmitting not-LLRS traffic 420.

As station 104 is aware of the scheduled reserved service period 410, it is able to stop its not-LLRS traffic transmission when LLRS traffic is to be exchanged between other stations of the BSS, although its own TXOP is not ending. Such stopping action is a passive LL measure because it reduces the use of the wireless medium by station 104 to exchange not-LLRS traffic in the network. Such reduction mechanism (or measure) gives priority to the LLRS traffic.

AP 110 can next transmit LLRS traffic to non-AP station 105 and then receives other LLRS traffic from non-AP station 102. The stations can apply active LL measures to perform the LLRS traffic exchange, for instance using specific network resources dedicated to LLRS traffic.

The above stopping of a current TXOP is only one example of possible LL measures.

More generally, LLRS capable stations are able to stop or to suspend their current data transmission in favor to LLRS data traffic transmission from another LLRS capable station while TXOP is not ended.

The example of FIG. 4 shows that if station 104 does not apply the passive measure in due time, the LLRS exchange within the reserved service period cannot take place (or at least interference occur), resulting in degraded QoS for the LLRS traffic.

The non-AP stations may declare their LLRS capability or capabilities (or not) when associating as described above with reference to FIG. 3. It is reminded that the non-AP stations already declare some 802.11 capabilities in the association request frame 360, for instance using the Extended Capabilities information element (IE) defined in P802.11-REVmd/D5.0, section 9.4.2.27.

According to embodiments of the invention, the non-AP station wishing to join the BSS declares own LLRS capabilities to apply one or more LL measures. It may declare to be passive LLRS capable and/or active LLRS capable, or declare merely it is LLRS capable. Of course, stations that are not LLRS capable will provide a declaration accordingly. Examples of signalling the LLRS capabilities in the management frame sent by the non-AP station are provided below with reference to FIGS. 5 and 6.

In a variant to providing the LLRS capabilities in the association request frame 360, the non-AP station may decide using the probe request frame 310. The latter is also a management frame. Therefore, a similar signalling of the LLRS capabilities can be used. In that scenario, at the reception of the probe request frame, the AP may analyse the LLRS capabilities of the non-AP station and decide to continue or not the association procedure with the non-AP station as described below.

In FIG. 5, a single bit 500 is added to the existing IE as a supplemental station capability. In the case of the known Extended Capabilities IE, available bits are from the $87^{th}$ bit. Bit 87 is thus for instance chosen to signal whether the non-AP station is capable to apply LL measures (LLRS capable—value set to 1) or not (value to 0). At this stage, no distinction is made between active and passive LLRS capability. This may mean the station has both passive and active LLRS capabilities. In a variant, this may mean the station has at least one of the two capabilities.

In FIG. 6, two bits 600 are added to the existing IE as supplemental station capabilities. In the case of the known Extended Capabilities IE, available bits are from the $87^{th}$ bit. Bits 88 and 89 are chosen to respectively:

signal whether the non-AP station is capable to apply passive LL measures when LLRS traffic is to be exchanged between other stations of the BSS, to the effect of reducing the use of a wireless medium by the non-AP station to exchange not-LLRS traffic in the network (bit 88 set to 1), or not (bit 88 set to 0). In that way, the station declares to be passive LLRS capable or not, and signal whether the non-AP station is capable to apply active LL measures when it has to exchange LLRS traffic with another station of the BSS, to the effect of using resources dedicated to LLRS traffic for exchanging the LLRS traffic in the network (bit 89 set to 1), or not (bit 89 set to 0). In that way, the station declares to be active LLRS capable or not.

Although FIG. 6 shows the two bits together, embodiments may contemplate using only one of the two bits, for instance for a non-AP station to only declare itself as a passive (or active) LLRS capable station or not.

Thanks to such signalling by the non-AP station (FIGS. 5 and 6), the AP becomes aware of which non-AP stations are LLRS capable and which are not, and therefore of which non-AP stations are supposed to transmit LLRS data traffic. As described below, the AP may refuse an association if the LLRS capabilities declared by a non-AP station do not match LLRS requirements of the BSS (for instance declared in the beacon 380 or probe response frame 320).

Figures 7, 8:
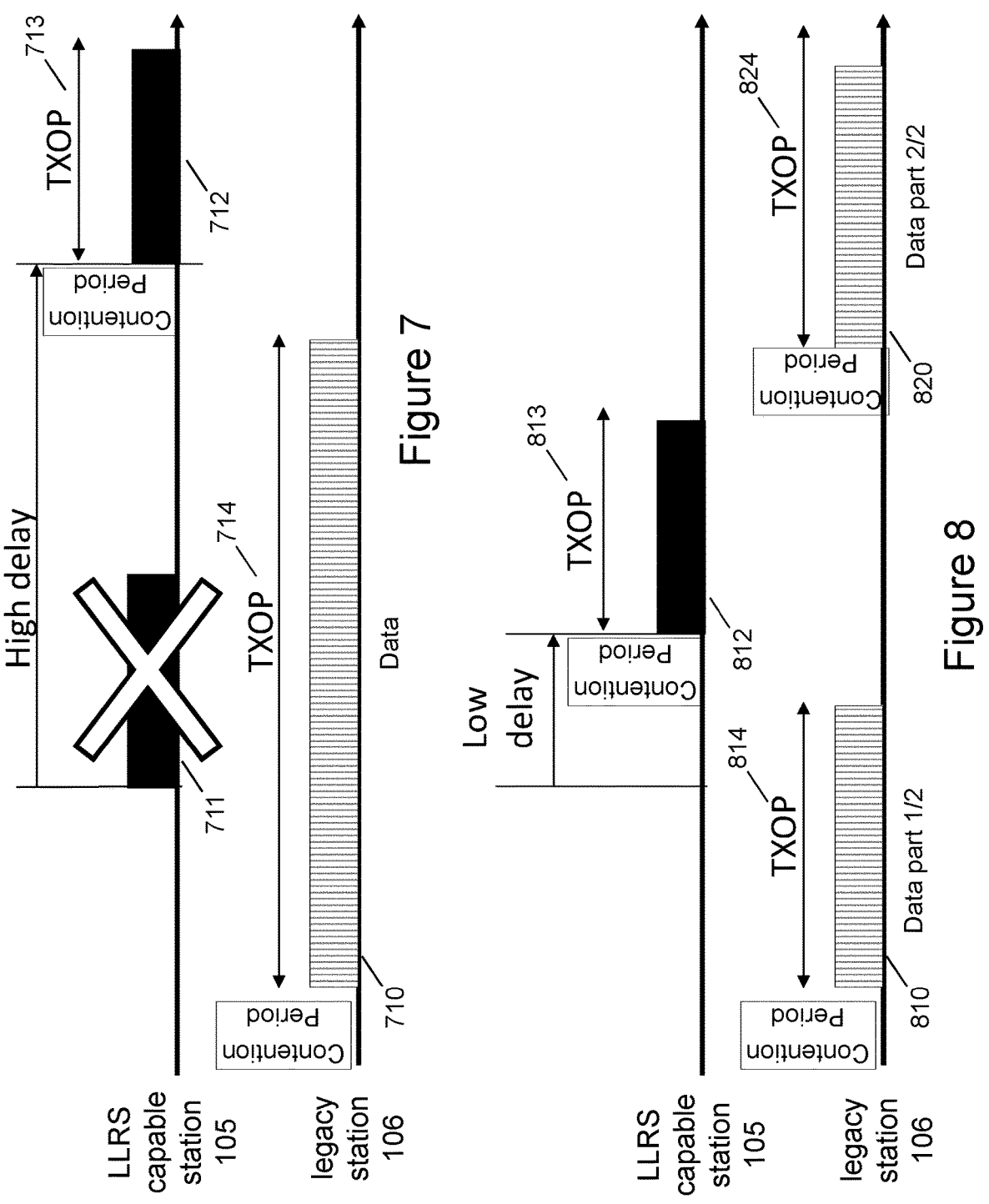
FIG. 7 illustrates, using a timeline, the impact of non-LLRS data traffic exchanged by legacy stations on the latency for LLRS data traffic.
FIG. 8 illustrates, using a timeline, the impact of embodiments of the present invention, in particular on the latency for LLRS data traffic.

FIG. 7 illustrates, using a timeline, the impact of non-LLRS data traffic exchanged by legacy stations (i.e. LLRS not-capable non-AP stations) on the latency for LLRS data traffic.

In FIG. 7, illustrates a long duration TXOP 714 performed by a legacy station 106 gains a TXOP 714 having a long duration, e.g. equal to TXOP limit provided by the AP (FIG. 2), in order to transmit non LLRS data traffic 710 over the wireless medium 100.

During this contention free period TXOP 714, a LLRS capable station 105 may be ready to transmit LLRS data traffic 711. Unfortunately, as the legacy station 106 does not implement LLRS measure feature (it is LLRS not-capable), it cannot stop its TXOP 714 and then give back the wireless medium 100 to the LLRS capable station 105.

The LLRS data transmission is postponed until the end of the legacy contention free period transmission opportunity: the LLRS capable station 105 has to wait until the end of TXOP 714 to get a new contention free period 713 using EDCA and then transmit the LLRS data traffic referenced here as 712. A high delay is therefore introduced before the LLRS capable station 105 can transmit its LLRS data traffic 711.

The delay may exceed a worst-case latency budget required for LLRS data traffic, which is dramatic for quality of real time applications. For example, if the worst-case latency budget of LLRS data traffic is 2 ms and TXOP 714 duration is 3 ms (complying with above table 1) considering 802.11ac video data traffic (non-LLRS data traffic), the LLRS data traffic is transmitted too late.

More generally, this example shows that when passive stations do not accept to apply the passive LL measures to reduce their impact on the network and free bandwidth, the LLRS data traffic is not given priority, hence the low latency, PDR and jitter requirements cannot be fulfilled.

A similar consideration can be made for the active stations. An active non-AP station may decide not to activate/use active LL measures, for instance not penalize its own not-LLRS data traffic (as web browsing, mail, etc.). However, this penalizes the overall LLRS efficiency of the network.

Also, the station designed on a previous 802.11 standard (being a non EHT non-AP stations) obviously cannot apply the LL measures. They can dramatically degrade the LLRS efficiency in the BSS as shown in this example.

To overcome the foregoing deficiencies, embodiments of the invention provide modifying the EDCA parameters of the BSS, in particular the TXOP limit values, when LLRS activity is detected (including suspected) in the network 10. Such modification makes it possible to reduce the TXOP limit values, hence the duration of the TXOP obtained by legacy non-AP stations. It results that LLRS capable stations can obtain more frequent (given the lower TXOP duration) opportunities to access the medium, despite the presence of LLRS not-capable stations.

To that end, the AP may initially set (e.g. using beacon frames) Enhanced Distributed Channel Access, EDCA, parameters for a first BSS, i.e. EDCA parameters to be applied by non-RECTIFIED SHEET (RULE 91) ISA/EP AP stations of the first BSS to access a wireless medium and transmit frames. Next, upon detecting low latency reliable service, LLRS, activity in the BSS or BSSs it manages, it may modify the EDCA parameters for the first BSS. The modified EDCA parameters are indeed transmitted to the concerned non-AP stations, e.g. through beacon frames.

With the modified EDCA parameters, in particular with a reduced TXOP limit value, legacy station 106 is no longer allowed to reserve a TXOP as large as TXOP 714.

FIG. 8 illustrates, using a timeline, technical effects of embodiments of the present invention, in particular on the latency for LLRS data traffic. This Figure illustrates the behavior of the stations in the BSS once the AP has broadcasted modified EDCA parameters, in particular a reduced TXOP limit, upon being aware of LLRS activity in the network.

Legacy station 106 can EDCA-reserve a TXOP 814 within the TXOP limit constraint, to transmit not-LLRS data traffic. As the TXOP limit may be severely reduced, TXOP 814 is shorter than TXOP 714; the wireless medium is released earlier. LLRS capable station 105 can therefore EDCA-access the wireless medium 100 substantially earlier (lower delay) than in FIG. 7: it then transmits its LLRS data traffic 812 during an obtained TXOP 813. Legacy station 106 which still has some not-LLRS data 820 may again EDCA-access the medium and transmit the data during an obtained TXOP 824 still complying with the TXOP limit.

It turns out that the LLRS capable stations are able to transmit LLRS data traffic in a shorter delay, therefore being inclined to meet worst-case latency requirements. The impact for not-LLRS capable stations is reasonable: their data transmission is performed in two (or more) times, starting at a similar time than data transmission 710 over TXOP 714 but split in two (or more) parts 810, 820 during different TXOPs 814, 824.

As the adaptation of the EDCA parameters impacts the throughput of the legacy stations by reducing their burst duration (TXOP duration), it is preferable that the adaptation be temporary, for instance as long as LLRS activity is ongoing. Therefore, upon detecting an end of the LLRS activity in the BSS or BSSs, the AP may restore (i.e. modify back) the set EDCA parameters for the first BSS.

In the case of FIG. 1, LLRS not-capable non-AP stations 103, 106, 107 may coexist with LLRS capable non-AP stations 102, 104, 105 within the same BSS. In that case, LLRS activity is detected is said first BSS.

However, in this configuration, the LLRS capable stations are also impacted by the modified EDCA parameters, in particular a reduced TXOP limit, although they are able to apply passive LL measures to stop an ongoing TXOP and favor LLRS data traffic.

Therefore, other embodiments are contemplated wherein the AP manages two or more BSSs sharing the same wireless medium 100, one (first BSS) being reserved to LLRS not-capable stations and another one (second BSS) reserved to LLRS capable stations. In that way, it is possible to only modify the EDCA parameters for the LLRS not-capable stations (i.e. the first BSS). In the second BSS, the LLRS capable stations are still allowed to reserve TXOPs with longer duration even to transmit not-LLRS data traffic, without impacting the LLRS data latency. This is because, as mentioned earlier, they are able to stop their ongoing TXOP at any time, to release the wireless medium for transmission of LLRS data traffic.

In this configuration, the LLRS activity is detected in another (second) BSS managed by the AP than the first BSS, and the EDCA parameters for the other (second) BSS may remain unchanged upon detecting the LLRS activity.

An illustration of this configuration is provided in FIG. 9, where a first BSS 901, named LEGACY_BSS, is created by AP 110 to manage legacy stations 103,106,107 (LLRS not-capable stations) and a second BSS 902, named LL_BSS, is created by AP 110 to manage the LLRS capable stations 102,104,105.

Multiple BSSs are possible either by creating independent BSSs or by using the multi-BSS standard feature (802.11be). LEGACY_BSS 901 and LL_BSS 902 receives two different EDCA Parameter Set elements from AP 110, which can be updated independently. As mentioned above the EDCA Parameter Set element (FIG. 2) may be accompanied with a MU EDCA Parameter Set element.

To achieve backward compatibility with legacy non-AP stations, LEGACY_BSS 901 is the transmitted BSS, while LL_BSS is a nontransmitted BSS.

When using the multi-BSS standard feature, a single beacon frame may be used by AP 110 to transmit the information relating to the two BSSs (including the EDCA parameters). As LEGACY_BSS is the transmitted BSS, its information (EDCA parameters) is provided first. This allows legacy stations to retrieve the communication parameters they need. LL_BSS information is transmitted over the same beacon frame, after the LEGACY_BSS information.

When the EDCA parameters (e.g. TXOP limit) for the first BSS, LEGACY_BSS 901, are modified upon detecting LLRS activity, a new beacon frame 380 may be sent where the LEGACY_BSS information is updated while the LL_BSS information may be kept unchanged.

Figure 10:
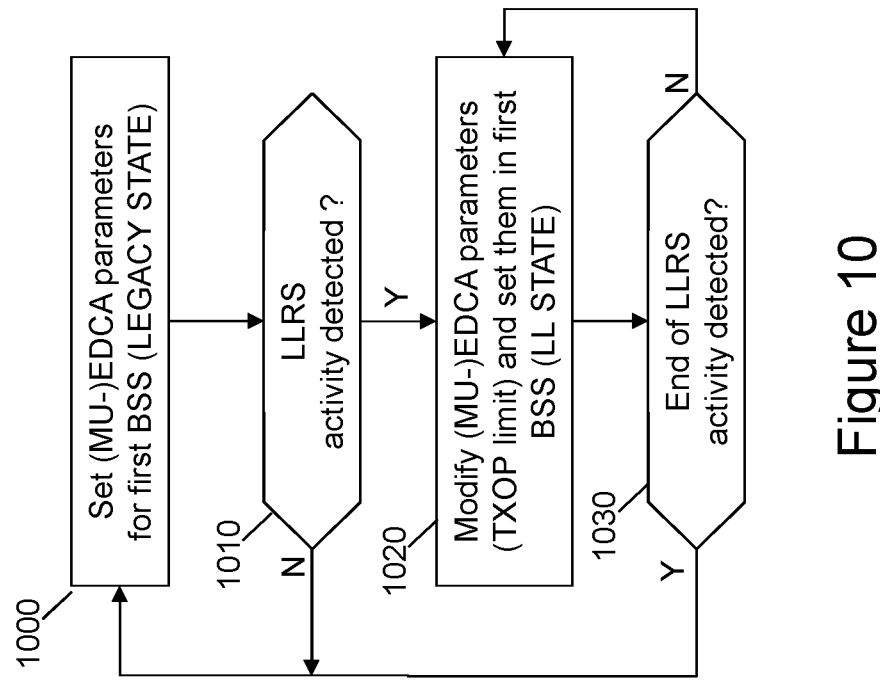
FIG. 10 illustrates, using a flowchart, general steps at an AP for embodiments of the present invention where the EDCA parameters are adapted/modified depending on LLRS activity in the network.

FIG. 10 illustrates, using a flowchart, general steps at the AP for embodiments of the present invention where the EDCA parameters are adapted/modified depending on LLRS activity in the network. The algorithm applies to both single-BSS embodiments and multi-BSS (LEGACY_BSS and LL_BSS) embodiments.

Here below, the first BSS refers to the single BSS or the LEGACY_BSS in case of multi-BSS.

At step 1000, AP 110 sets the EDCA parameters (including the MU EDCA parameters) for the first BSS, for example upon creating the first BSS or when updating its EDCA parameters.

The setting is made in a conventional manner: it may include broadcasting a beacon frame including the EDCA parameters or sending a probe response frame including the EDCA parameters to each probe requesting non-AP station. The EDCA parameters are conveyed in (MU-)EDCA Parameter Set IEs (e.g. 210 in FIG. 2). The EDCA parameter values may be those indicated in Table 1 above.

This state of the first BSS (LEGACY STATE) corresponds to the absence of LLRS activity detected by AP 110 over the wireless network or in the BSSs it manages.

The non-AP stations of the first BSS thus access the wireless medium as described above with reference to FIG. 7 for instance. This configuration allows high throughput data transmission to be achieved.

At step 1010, AP 110 becomes aware of LLRS activity in the network, in particular concerning the wireless medium 100. For instance, AP 110 may detect LLRS activity in the BSS or BSSs it manages: this may be LLRS activity in the first BSS or LLRS activity in another BSS (e.g. LL_BSS above).

Such detection may include for AP 110 to be involved in the LLRS measures as described in FIG. 4 or to detect any LLRS measures in the network.

It may also include, for the AP, to receive LLRS capability for a non-AP station in its BSSs sharing the wireless medium 100 (incl. the first BSS). In that case, as soon as a LLRS capable non-AP station is present, the state of the first BSS can be changed as described below (into LL STATE). Reversely, as soon as there is no more LLRS capable non-AP station in the first BSS or in its BSSs, the state of the first BSS can be configured back to its prior state (LEGACY STATE).

Alternatively, it may include, for the AP, to exchange LLRS data traffic (i.e. UpLink or DownLink traffic) with a non-AP station in its BSSs (incl. the first BSS). Data traffic may carry a predefined Traffic Identifier to identify it as LLRS traffic, or be of a predefined access category (e.g. AC_VI or AC_VO). Therefore, as soon as AP 110 is involved in LLRS data exchange, the state of the first BSS is changed. Reversely, once the LLRS data exchanges with the AP end, the state of the first BSS may be configured back to its prior state.

Another alternative includes for the AP to receive, from a non-AP station, a message signaling LLRS data traffic requirements or needs. This may for instance be a TSPEC message indicating a low latency, i.e. a specified latency lower than a predefined TXOP limit (e.g. the TXOP limit set in the EDCA parameters of the BSS). In this situation, as soon as the AP becomes aware of station needs in terms of LLRS data traffic, the state of the first BSS may be changed. Reversely, as soon as the station needs are satisfied and no more LLRS need is identified, the AP may switch back the first BSS to its prior state.

For instance, the Delay Bound field in the TSPEC specifies a maximum amount of time, in micro-seconds, to complete a successful transmission, including retransmission if any. LLRS activity may be declared when Delay Bound<TXOP limit without retransmission or Delay Bound<(N+1)*TXOP limit with retransmission (N being an integer, for instance N=1 for an immediate single retransmission).

Once LLRS activity has been detected in the network (first BSS or LL_BSS for example), AP 110 modifies the EDCA parameters for the first BSS, in particular the Transmission Opportunity, TXOP, limit parameter that defines a maximum duration for the TXOPs and which is lowered (compared to the TXOP limit parameter of the EDCA parameters before modification). This is step 1020.

This includes forming a new EDCA Parameter Set IE with the modified TXOP limit (in field 215 for each AC) for instance to a predefined TXOP_LL limit value as shown in the table below. The same TXOP_LL limit value may be used throughout the ACs or they may be different one AC from the other.

As mentioned above, the TXOP_LL values help to reduce the impact of not-LLRS data traffic transmitted by legacy non-AP stations or LLRS not-capable non-AP stations.

US 12,615,666 B2

21 22

TABLE 2

| | ECW$_{min}$ | TXOP limit | | | | |
| | | | 802.11REVmd ™/D5.0 | | | |
| AC | ECW$_{max}$ AIFSN | 802.11n | DSSS | OFDM (ERP, HT, VHT) | 802.11ac | 802.11be LLRS |
|---|---|---|---|---|---|---|
| AC_BK | Un-changed | 0 | 3.264 ms | 2.528 ms | 0 | TXOP_LL(BK) |
| AC_BE | | 0 | 3.264 ms | 2.528 ms | 0 | TXOP_LL(BE) |
| AC_VI | | 3.008 ms | 6.016 ms | 4.096 ms | 22.56 ms | TXOP_LL(VI) |
| AC_VO | | 1.504 ms | 3.264 ms | 2.080 ms | 11.28 ms | TXOP_LL(VO) |
| non-QOS | | 0 | 0 | 0 | 0 | TXOP_LL(noQoS) |

Preferably, the TXOP_LL values are set lower (ideally strictly lower) than a worst-case latency budget (depending on the data type) required for LLRS data traffic, for instance as mentioned in document "IEEE 802.11 Real Time Applications TIG Report", referenced IEEE 802.11-18/2009r6.

As examples, a TXOP_LL value may be set to:

half a value of such a worst-case latency budget, for instance the lowest non-zero value, a TXOP limit value from table 9-137 of IEEE 802.11 Standard®, version 2016, or from table 8-105 of IEEE 802.11 Standard®, version 2012, that is lower than a worst-case latency budget for LLRS data traffic as defined in the document "IEEE 802.11 Real Time Applications TIG Report", referenced IEEE 802.11-18/2009r6. For instance 1.504 ms may be used if the worst-case latency budget is 2 ms, a ratio between a worst-case latency budget for LLRS data traffic as defined in the document "IEEE 802.11 Real Time Applications TIG Report", referenced IEEE 802.11-18/2009r6 and a number that is based on a number of non-AP stations having no LLRS capability (i.e. not implementing LLRS) in the first BSS. For instance it may be the ratio between the worst-case latency budget and the number of LLRS not-capable stations, value 0, i.e. restricting the TXOP to the transmission of a single MAC service data unit, MSDU, or management frame, a value equal to 1.024 ms. This reduces to the minimum the duration of any TXOP performed by any LLRS not-capable non-AP stations, a value equal or lower than Delay Bound values indicating, in TSPEC information elements managed by the AP and received from LLRS capable non-AP stations, maximum amounts of time to complete successful transmissions, a value equal or lower than ratios, each between a Delay Bound value indicating, in a TSPEC information element managed by the AP and received from a LLRS capable non-AP station, a maximum amount of time to complete a successful transmission and an integer N increased from 1 in case of retransmission policy.

This reduces to the minimum the duration of any TXOP performed by any LLRS not-capable non-AP stations in favor to the low latency data traffic transmitted by any LLRS capable non-AP stations.

The modified EDCA parameters for the first BSS are broadcast in the first BSS using a beacon frame. Each non-AP station of the first BSS accordingly sets its local TXOP limit values to the modified TXOP_LL(i) values. The first BSS thus enters the state (LL STATE) during which LLRS activity takes place over the shared wireless medium. The non-AP stations of the first BSS thus access the wireless medium with shorter TXOPs, as described above with reference to FIG. 8 for instance.

This configuration allows low latency transmission to be achieved for LLRS data traffic, even when LLRS capable stations and LLRS not-capable stations are associated within the same AP.

Next, at step 1030, AP 110 determines whether the LLRS activity stopped. Exemplary situations of such determination are provided above. Upon detecting an end of the LLRS activity in the BSS or BSSs, AP 110 loops back to step 1000 to restore (i.e. modifying back) the previous EDCA parameters for the first BSS. The first BSS therefore enters back the LEGACY STATE when longer TXOPs can be obtained by the non-AP stations.

As shown in FIGS. 1 and 9, Direct Link communications may also take place over the wireless medium 110 (here between associated non-AP station 107 and not-associated station 101). The P2P stations (here 101 and 107) directly negotiate their communication parameters, including the TXOP duration, without consideration of the (MU-)EDCA parameters they may know.

This negotiation can be performed using QoS control fields in the MAC header of exchanged frames, as described in the IEEE 802.11-2007 standard. Particularly, the "QoS Data(+)CF-Poll" frame can be used to request a TXOP duration ('TXOP duration requested' in the QoS control field) and the "QoS Data(+)CF-Ack" frame can be used to response with a TXOP limit ('TXOP limit' in the QoS control field).

To further minimize the chance of collisions, and as a more robust collision detect mechanism, the initiating P2P station may begin a sequence with a short control frame exchange using robustly modulated RTS and CTS frames permitting a contention free burst period during a transmit opportunity TXOP. This sets the NAV in the stations surrounding both the P2P initiator and P2P responder, some of which may be hidden nodes unable to detect the more remote station's transmissions and thus only able to defer for frame transmissions from nearby nodes.

RTS and CTS frames include also a duration field which can be used to know the remaining duration of the current TXOP.

The P2P process does not follow the rules of the BSSs, hence the EDCA parameters of the first BSS. DiL or P2P communications therefore have the same impact as the one shown in FIG. 7: long TXOPs that dramatically degrade the latency of LLRS data traffic To improve this situation, the P2P station also belonging to the first BSS (here station 107 which has knowledge of the EDCA parameters) may negotiate, based on the TXOP limit parameter, a duration of a P2P TXOP with the other P2P station (here station 101) based on the TXOP limit currently applicable in the EDCA parameters. For instance, the duration of the P2P TXOP is made shorter than the TXOP limit parameter. Therefore, should the first BSS be in the LEGACY STATE, the P2P TXOP may have a large duration. On the other hand, when the first BSS is in the LL STATE (because LLRS activity has been detected), the P2P TXOP is made with a short duration, compliant with the LLRS latency requirements.

If both P2P stations belong to respective BSS, they may negotiate the P2P TXOP duration using the lowest TXOP limit value.

In practice, P2P station 107 may receive a TXOP duration from P2P station 101 and reply with a reduced TXOP duration given the TXOP limit parameter (e.g. if the received TXOP duration is higher than the TXOP limit parameter applicable for the first BSS and the AC considered).

Turning now to the case of multi-BSS, AP 110 may simultaneously manage LEGACY_BSS 901 and LL_BSS 902. As mentioned above, grouping the LLRS not-capable stations in one BSS (LEGACY_BSS) and the LLRS capable stations in another BSS (LL_BSS) advantageously allows to impact the TXOP duration to the LLRS not-capable stations only (by setting appropriate EDCA parameters only for LEGACY_BSS). An efficient management of the association of stations with the AP is therefore required.

It is proposed that the AP transmits, to a given non-AP station, an association-related management frame refusing an association of the non-AP station with a target BSS managed by the AP or disassociating the non-AP station from the target BSS, wherein the association-related management frame includes a code indicating another BSS managed by the AP is available.

Such code thus makes it possible to warn a LLRS not-capable station that the target BSS is not appropriate to it (LL_BSS) but another appropriate BSS (LEGACY_BSS) is available at the same AP. Alternatively, such a code may warn a LLRS capable station that the target BSS is not appropriate to it (LEGACY_BSS) but another more appropriate BSS (LL_BSS) is available at the same AP.

Such signalling may take place during the association phase (i.e. in association response frame 870) or take place through the disassociation procedure (i.e. in a disassociation request or response frame 390 from the AP).

Figures 11A, 11B:
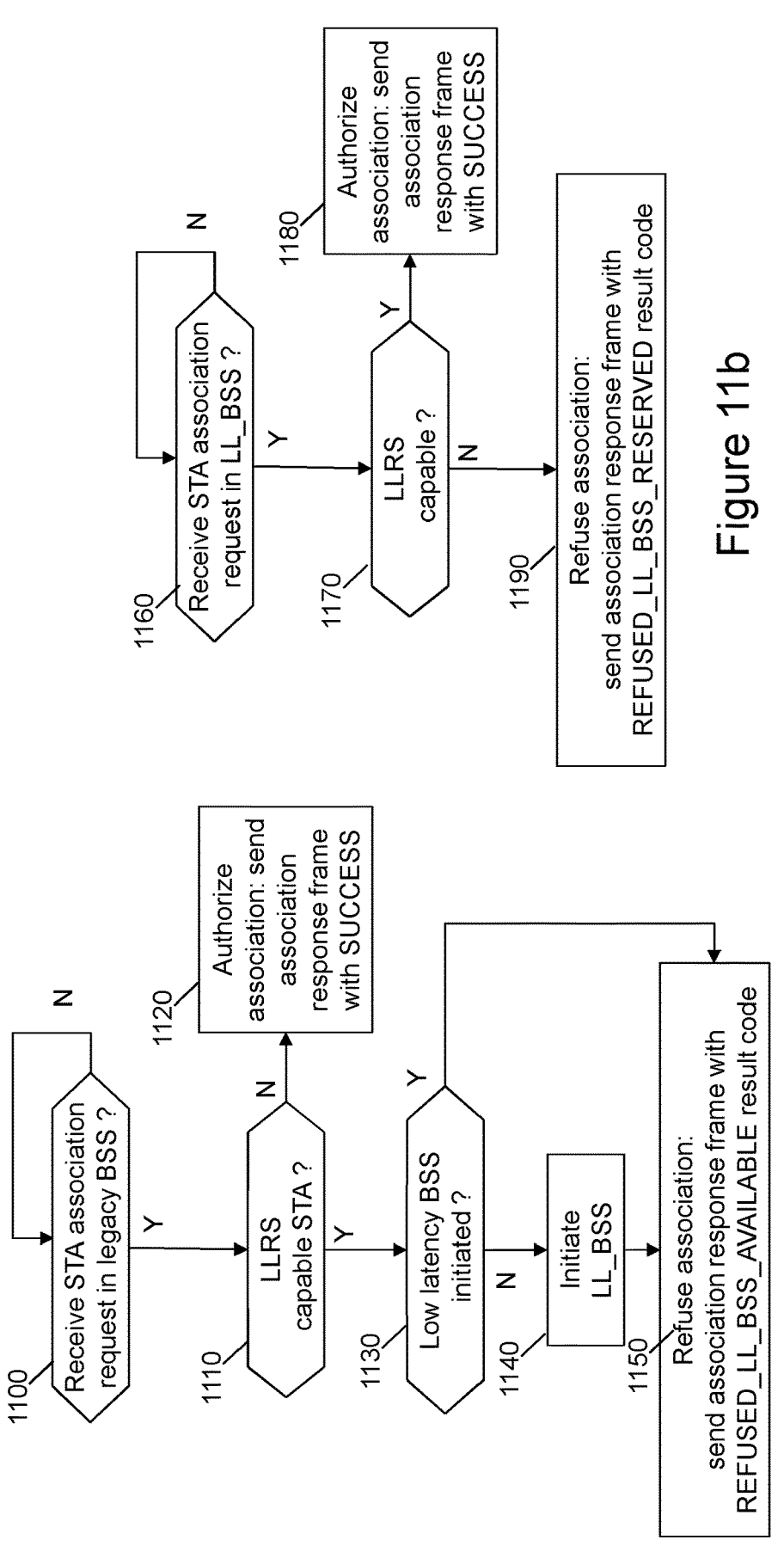
FIGS. 11*a* and 11*b* illustrate, using flowcharts, general operations of BSS management by an AP during an association phase for a non-AP station wishing to join respectively a regular BSS and a low latency BSS, according to embodiments of the invention.

FIG. 11a illustrates, using a flowchart, general operations for such management at the AP during an association phase for a non-AP station wishing to join LEGACY_BSS.

Step 1100 determines when an association request frame 360 is received from a non-AP station for LEGACY_BSS 901. It is reminded that this BSS is reserved to LLRS not-capable stations.

Therefore, at step 1110, the AP determines whether the requesting non-AP station is LLRS capable or not, using for instance the capability declaration shown in FIG. 5. In that way, the AP determines whether a capability of the non-AP station matches a capability of the BSS considered with respect to a low latency reliable service, LLRS.

If the requesting station is LLRS not-capable, the association can be authorized, and a response (association response frame 370 e.g. with a conventional result code SUCCESS) is sent to the station at step 1120.

If the requesting station is LLRS capable, the BSS is not appropriate compared to LL_BSS the AP instantiates or can instantiate.

Therefore, at step 1130, the AP determines whether the low latency BSS (LL_BSS) is already initiated or not. In the negative, at step 1140, the AP creates LL_BSS 902 either by using a second beacon frame or by using the multi-BSS feature.

In the affirmative or after step 1140, the AP refuses the association and signals to the requesting LLRS capable station that LL_BSS is available.

This is made by sending (step 1150) an association response frame 370 with a newly proposed result code, for instance REFUSED_LL_BSS_AVAILABLE. This code thus supplements the result codes listed in section 6.3.7.5.2 of IEEE 802.11 Standard®, version 2016.

The requesting LLRS capable station receiving such result code may search for another BSS of the same AP. Such information may be retrieved from the beacon frames sent by the AP. Responsive to identifying another BSS, ideally LL_BSS, the requesting station may transmit an association request frame to the AP to associate with this other BSS. The process of FIG. 11b may then be performed by the AP receiving the association request frame with a view of accepting (or not) the association. Thanks to the result code redirecting the requesting station, it is expected that ultimately a capability of the redirected non-AP station matches a LLRS capability of the other BSS to which it is redirected.

FIG. 11b illustrates, using a flowchart, general operations for BSS management by the AP during an association phase for a non-AP station wishing to join LL_BSS.

Step 1160 determines when an association request frame 360 is received from a non-AP station for LL_BSS 902. It is reminded that this BSS is reserved to LLRS capable stations.

Therefore, at step 1170, the AP determines whether the requesting non-AP station is LLRS capable or not, using for instance the capability declaration shown in FIG. 5.

If the requesting station is LLRS capable, the association can be authorized, and a response (association response frame 370 e.g. with a conventional result code SUCCESS) is sent to the station at step 1180. This is for instance the case of the above LLRS capable non-AP station that has received the result code REFUSED_LL_BSS_AVAILABLE when trying to join LEGACY_BSS, and that was directed to LL_BSS for association.

If the requesting station is LLRS not-capable, the BSS is not appropriate compared to LEGACY_BSS the AP already instantiates.

Therefore, at step 1190, the AP refuses the association and signals to the requesting LLRS not-capable station that LEGACY_BSS is available.

This is made by sending an association response frame 370 with a newly proposed result code, for instance REFUSED_LL_BSS_RESERVED. This code thus supplements the result codes listed in section 6.3.7.5.2 of IEEE 802.11 Standard®, version 2016.

The requesting LLRS not-capable station receiving such result code may search for another BSS of the same AP. Such information may be retrieved from the beacon frames sent by the AP. Responsive to identifying another BSS, ideally LEGACY_BSS, the requesting station may transmit an association request frame to the AP to associate with this other BSS. The process of FIG. 11a is then performed by the AP receiving the association request frame with a view of accepting (or not) the association. Thanks to the result code redirecting the requesting station, it is expected that ultimately a capability of the redirected non-AP station matches a LLRS capability of the other BSS to which it is redirected.

Thanks to new result codes REFUSED_LL_BS-S_AVAILABLE and REFUSED_LL_BSS_RESERVED indicating the reason of association rejection, an AP determining a LLRS capability mismatch between an association requesting non-AP station and a target BSS may redirect the requesting non-AP station to another BSS it instantiates. A requesting non-AP station receiving such codes may search another BSS managed by the same AP, e.g. through the multi-BSS feature, and solicit association with this other BSS.

Figures 12A, 12B:
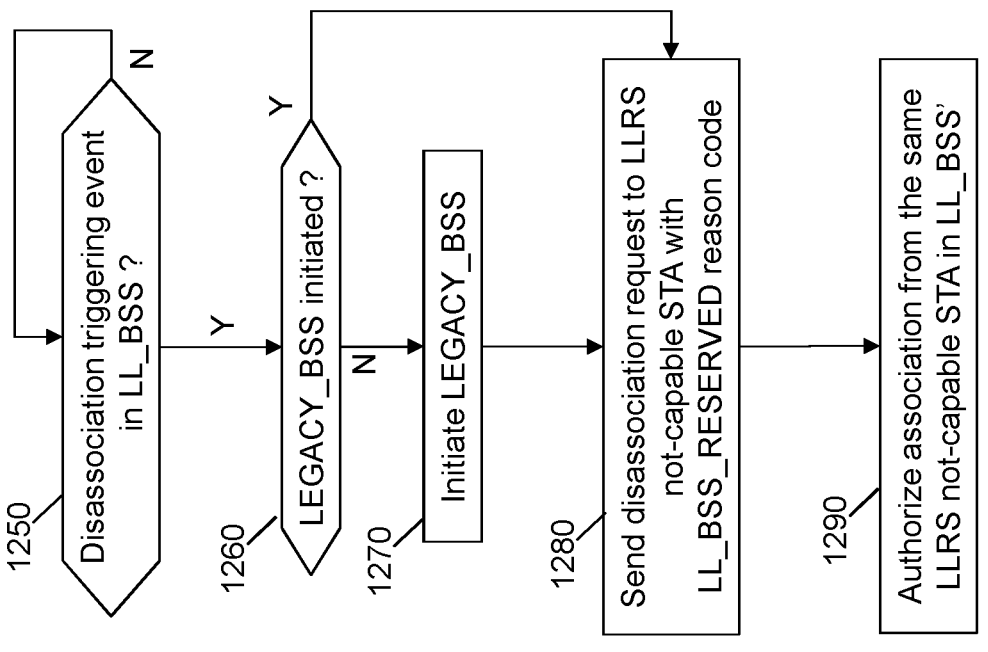
FIGS. 12*a* and 12*b* illustrate, using flowcharts, general operations of BSS management by an AP during a disassociation phase of non-AP stations respectively from a regular BSS and a low latency BSS, according to embodiments of the invention.

FIG. 12a illustrates, using a flowchart, general operations for BSS management by AP during a disassociation phase of a LLRS capable non-AP station belonging to LEGACY-_BSS 901.

Disassociation is performed when a LLRS capability mismatch appears between one (or more) non-AP station associated with a first BSS and the first BSS. The AP thus has to determine whether a capability of the already associated non-AP station does not match a capability of the first BSS with respect to a low latency reliable service, LLRS.

Such situation may happen for several reasons. For instance, a non-AP station already associated with a first BSS (i.e. during the life of the first BSS) may change its LLRS capability declaration.

It may also happen when the AP detects LLRS activity (either a start thereof, or a substantial amount thereof) in the network and thus decides (based on some criteria) to instantiate both LEGACY_BSS and LL_BSS. In other words, the AP may, upon detecting LLRS activity in the network, restrict the first BSS to LLRS not-capable non-AP stations. The first BSS thus becomes LEGACY_BSS and LLRS capable stations should move to LL_BSS.

Step 1200 thus consists in checking whether such situation occurs and then triggers the disassociation process for non-AP stations not adapted (i.e. LLRS capable) to LEGA-CY_BSS considered.

At step 1210, the AP determines whether the low latency BSS (LL_BSS 902) is already initiated or not. In the negative, at step 1220, the AP creates LL_BSS 902 either by using a second beacon frame or by using the multi-BSS feature.

In the affirmative or after step 1220, the AP disassociates the (or several) non-AP station having non-matching LLRS capability with LEGACY_BSS and signals to the station under disassociation process that LL_BSS is however available.

This is made by sending (step 1230) a disassociation request frame 390 with a newly proposed reason code, for instance LL_BSS_AVAILABLE. This code thus supplements the reason codes listed in section 9.4.1.2 of IEEE 802.11 Standard®, version 2016.

The LLRS capable station under disassociation process and receiving such reason code may search for another BSS of the same AP. Such information may be retrieved from the beacon frames sent by the AP. Responsive to identifying another BSS, ideally LL_BSS, the requesting station may transmit an association request frame to the AP to associate with this other BSS. The above process of FIG. 11b may then be performed by the AP with a view of authorizing the association of the disassociated LLRS capable station with LL_BSS (step 1240).

FIG. 12b illustrates, using a flowchart, general operations for BSS management by the AP during a disassociation phase of a LLRS not-capable non-AP station belonging to LL_BSS 902. It is quite similar to FIG. 12b where the BSSs has exchanged roles.

Disassociation is performed when a LLRS capability mismatch appears between one (or more) non-AP station associated with a first BSS and the first BSS. The AP thus has to determine whether a capability of the already associated non-AP station does not match a capability of the first BSS with respect to a low latency reliable service, LLRS.

Such situation may happen for several reasons. For instance, a non-AP station already associated with a first BSS (i.e. during the life of the first BSS) may change its LLRS capability declaration.

It may also happen when the AP detects LLRS activity (either a start thereof, or a substantial amount thereof) in the network and thus decides (based on some criteria) to instantiate both LEGACY_BSS and LL_BSS. In other words, the AP may, upon detecting LLRS activity in the network, restrict the first BSS to LLRS capable non-AP stations. The first BSS thus becomes LL_BSS and LLRS not-capable stations should move to LEGACY_BSS.

Step 1250 thus consists in checking whether such situation occurs and then triggers the disassociation process for non-AP stations not adapted (i.e. LLRS not-capable) to LL_BSS considered.

At step 1260, the AP determines whether the legacy BSS (LEGACY_BSS 901) is already initiated or not. In the negative, at step 1270, the AP creates LEGACY_BSS 902 either by using a second beacon frame or by using the multi-BSS feature. Preferably, LEGACY_BSS 902 is always instantiated as the transmitted BSS, as soon as the AP is switched on. Indeed, LEGACY_BSS can be initiated permanently or 'on-demand' when LLRS is active in the network.

In the affirmative or after step 1270, the AP disassociates the (or several) non-AP station having non-matching LLRS capability with LL_BSS and signals to the station under disassociation process that LEGACY_BSS is however available.

This is made by sending (step 1280) a disassociation request frame 390 with a newly proposed reason code, for instance LL_BSS_RESERVED. This code thus supplements the reason codes listed in section 9.4.1.2 of IEEE 802.11 Standard®, version 2016.

The LLRS not-capable station under disassociation process and receiving such reason code may search for another BSS of the same AP. Such information may be retrieved from the beacon frames sent by the AP. Responsive to identifying another BSS, ideally LEGACY_BSS, the requesting station may transmit an association request frame to the AP to associate with this other BSS. The above process of FIG. 11a may then be performed by the AP with a view of authorizing the association of the disassociated LLRS not-capable station with LEGACY_BSS (step 1290).

Thanks to new reason codes LL_BSS_AVAILABLE and LL_BSS_RESERVED, an AP determining a LLRS capability mismatch between an associated non-AP station and the BSS may redirect the mismatching non-AP station to another more adapted BSS it instantiates. A mismatching non-AP station receiving such codes may search the other BSS managed by the same AP, e.g. through the multi-BSS feature, and solicit association with this more adapted BSS.

The above embodiments show that an AP may dynamically manage its BSS or BSSs to improve the latency for LLRS data traffic FIG. 13 schematically illustrates a communication device 1300, either a non-AP station 101-107 or the access point 110, of the radio network 100, configured to implement at least one embodiment of the present invention. The communication device 1300 may preferably be a device such as a micro-computer, a workstation or a light portable device. The communication device 1300 comprises a communication bus 1313 to which there are preferably connected:

a central processing unit 1301, such as a processor, denoted CPU;

a memory 1303 for storing an executable code of methods or steps of the methods according to embodiments of the invention as well as the registers adapted to record variables and parameters necessary for implementing the methods; and at least one communication interface 1302 connected to a wireless communication network, for example a communication network according to one of the IEEE 802.11 family of standards, via transmitting and receiving antennas 1304.

Preferably the communication bus provides communication and interoperability between the various elements included in the communication device 1300 or connected to it. The representation of the bus is not limiting and in particular the central processing unit is operable to communicate instructions to any element of the communication device 1300 directly or by means of another element of the communication device 1300.

The executable code may be stored in a memory that may either be read only, a hard disk or on a removable digital medium such as for example a disk. According to an optional variant, the executable code of the programs can be received by means of the communication network, via the interface 1302, in order to be stored in the memory of the communication device 1300 before being executed.

In an embodiment, the device is a programmable apparatus which uses software to implement embodiments of the invention. However, alternatively, embodiments of the present invention may be implemented, totally or in partially, in hardware (for example, in the form of an Application Specific Integrated Circuit or ASIC).

Figures 13A, 13B:
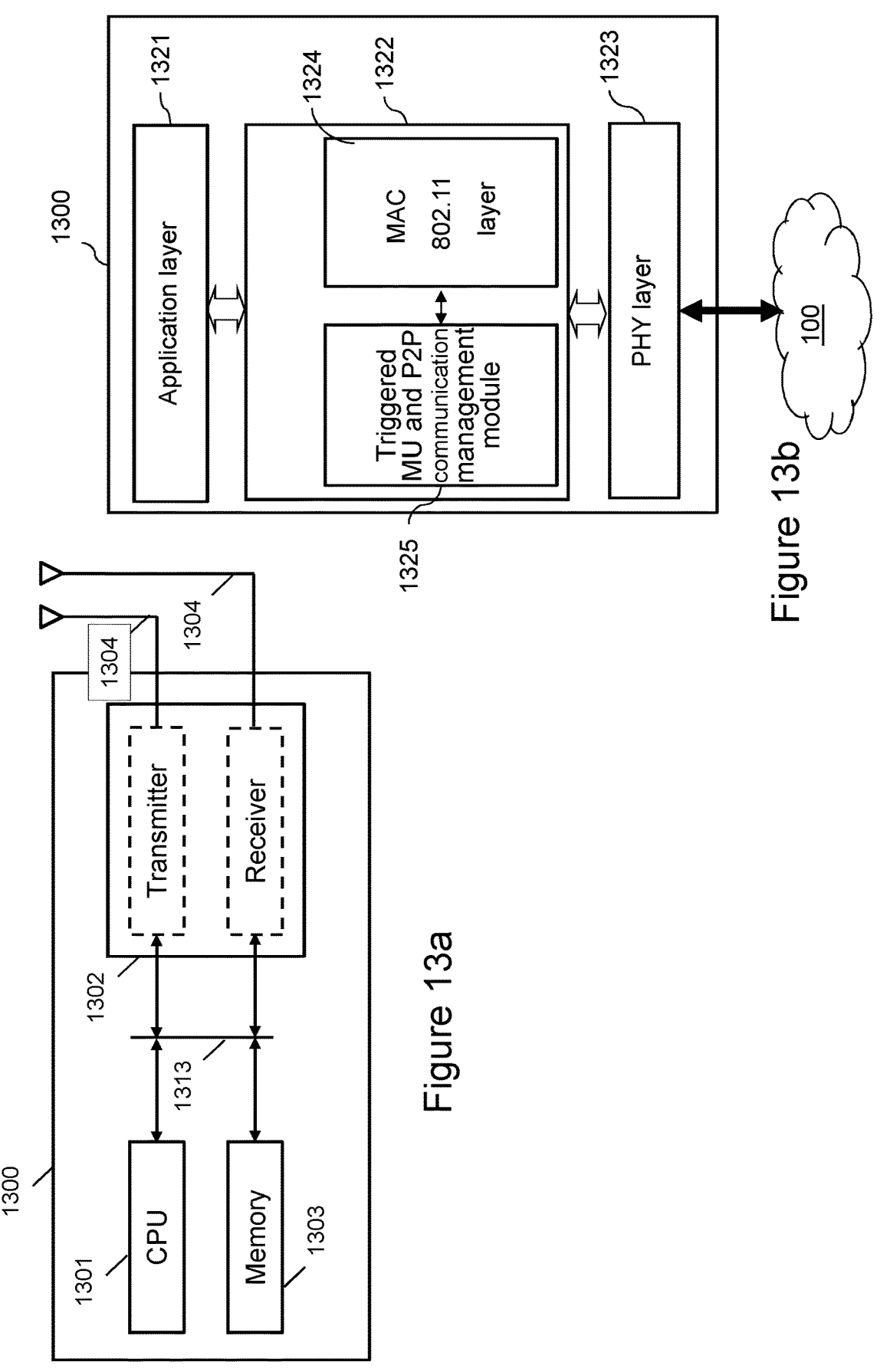
FIG. 13*a* shows a schematic representation a communication device in accordance with embodiments of the present invention.
FIG. 13*b* shows a schematic representation of a wireless communication device in accordance with embodiments of the present invention.

FIG. 13*b* is a block diagram schematically illustrating the architecture of the communication device 1300, either AP 110 or one of stations 101-107, adapted to carry out, at least partially, the invention. As illustrated, device 1300 comprises a physical (PHY) layer block 1323, a MAC layer block 1322, and an application layer block 1321.

The PHY layer block 1323 (here an 802.11 standardized PHY layer) has the task of formatting, modulating on or demodulating from any 20 MHz channel or the composite channel, and thus sending or receiving frames over the radio medium used 100, such as 802.11 frames, to reserve a TXOP and exchange (LLRS or not) data.

The MAC layer block or controller 1322 preferably comprises an 802.11 MAC layer 1324 implementing conventional 802.11ax MAC operations, and additional block 1325 for carrying out, at least partially, the invention. The MAC layer block 1322 may optionally be implemented in software, which software is executed by CPU 1301.

Preferably, the additional block 1325, referred to as LLRS management module, implements the part of embodiments of the invention.

At the AP, it manages the EDCA parameters of its BBSs, depending on whether LLRS activity is detected. It also manage the association and disassociation procedures in order to provide the above result or reason codes to redirect some non-AP stations to another more adapted BSS.

At a non-AP station, it declares the station LLRS capabilities and processes such result or reason code in order to find another BSS and associate with it. It may also adapt the TXOP negotiation for a DiL or P2P TXOP, with respect to a TXOP limit known for a BSS it is associated with.

802.11 MAC layer 1324 and LLRS management module 1325 interact one with the other in order to perform LLRS management of the BSSs and/or of the DiL TXOPs, according to embodiments of the invention.

On top of the Figure, application layer block 1321 runs an application that generates and receives data packets, for example data packets such as a video stream. Application layer block 1321 represents all the stack layers above MAC layer according to ISO standardization.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a wireless network, the communication method comprising, at an access-point, AP:

receiving capabilities from a non-access-point, non-AP, station;

determining whether a capability of the non-AP station matches a capability of a first Basic Service Set, BSS, with respect to a low latency reliable service, LLRS;

transmitting, to the non-AP station, an association-related management frame refusing an association of the non-AP station with the first BSS managed by the AP or disassociating the non-AP station from the first BSS, wherein the association-related management frame includes a code indicating another BSS managed by the AP is available, wherein transmitting the association-related management frame is responsive to determining no match.

2. The method of claim 1, wherein the non-AP station is LLRS capable and the first BSS is dedicated to LLRS not-capable non-AP stations.

3. The method of claim 1, wherein the non-AP station is not LLRS capable and the first BSS is dedicated to LLRS capable non-AP stations.

4. The method of claim 1, further comprising, at the AP, initiating said another BSS responsive to receiving a LLRS capability from the non-AP station.

5. The method of claim 1, further comprising, at the AP, upon detecting LLRS activity in the network, restricting the first BSS to LLRS capable non-AP stations or restricting the first BSS to LLRS not-capable non-AP stations.

6. The method of claim 1, further comprising, at the AP after the transmitting, receiving an association request from the non-AP station to associate with another BSS managed by the AP.

7. The method of claim 6, wherein a capability of the non-AP station matches a capability of said another BSS with respect to the LLRS.

8. A wireless communication device comprising at least one microprocessor configured for carrying out the method of claim 1.

9. A non-transitory computer-readable medium storing a program which, when executed by a microprocessor or computer system in a wireless device, causes the wireless device to perform the method of claim 1.

10. The communication method according to claim 1, further comprising:

scheduling a TWT service period during which a communication of non-low latency traffic is restricted;

wherein the capability of the first BSS with respect to the LLRS is a capability of suspending a communication of a traffic that is not a low latency sensitive traffic before the TWT service period is started.

11. The communication method according to claim 1, wherein a limit of a length of a transmission opportunity, TXOP, in a BSS to which a non-AP station having the capability is associated is longer than a limit of a length of TXOP in other BSS to which non-AP station having the capability is not associated.

12. A communication method in a wireless network, the communication method comprising, at a non-access-point, non-AP, station:

receiving, from an access point, AP, an association-related management frame refusing an association of the non-AP station with a first Basic Service Set, BSS, managed by the AP or disassociating the non-AP station from the first BSS, wherein the association-related management frame includes a code indicating another BSS managed by the AP is available, wherein the code indicates that the first BSS is dedicated to low latency reliable service, LLRS, not-capable non-AP stations and another BSS dedicated to LLRS capable non-AP stations that is managed by the AP is available, or the code indicates that the first BSS is dedicated to LLRS capable non-AP stations and another BSS dedicated to LLRS not-capable non-AP stations that is managed by the AP is available.

13. The method of claim 12, further comprising, at the non-AP station, after the receiving, transmitting an association request to the AP to associate with another BSS managed by the AP.

\* \* \* \* \*